US005917995A

United States Patent [19]
Ota

[11] Patent Number: 5,917,995
[45] Date of Patent: Jun. 29, 1999

[54] PRINTER HAVING A JOINT MECHANISM FOR FITTING A PAPER FEED UNIT

[75] Inventor: Yukio Ota, Tokyo, Japan

[73] Assignee: Oki Data Corporation, Tokyo, Japan

[21] Appl. No.: 08/753,561

[22] Filed: Nov. 26, 1996

[30] Foreign Application Priority Data

Dec. 1, 1995 [JP] Japan .................................... 7-313955

[51] Int. Cl.$^6$ ............................. G06F 15/00; B41J 29/13; B41J 11/56

[52] U.S. Cl. .......................... 395/111; 347/108; 347/222; 347/245; 400/680; 400/681; 400/691

[58] Field of Search .................................... 395/101, 102, 395/103, 108, 111, 112, 114; 347/43, 173, 176, 152, 108, 222, 245; 400/680, 681, 682, 685, 691, 693; D18/50, 54, 55

[56] References Cited

U.S. PATENT DOCUMENTS 5,462,375 10/1995 Isobo et al. ............................. 400/680
5,646,872 7/1997 Yonenaga et al. ................. 364/710.13

FOREIGN PATENT DOCUMENTS 4-244879 1/1992 Japan .
4-244879 9/1992 Japan .

*Primary Examiner*—Edward L. Coles
*Assistant Examiner*—Mark Wallerson
*Attorney, Agent, or Firm*—Panitch Schwarze Jacobs & Nadel, P.C.

[57] ABSTRACT

A printer for printing image on a paper according to the print data output from a notebook computer. The printer has a paper-feed unit including a paper holding section for holding the paper to be printed on and a table on which the notebook computer can be placed; a print unit including a print section for printing image according to the print data on a paper supplied from the paper-feed unit and a receiving section for receiving a printed paper; and a joint mechanism for rotatably fitting the print unit on the paper-feed unit. The joint mechanism includes a shaft on which said print unit is carried so as to be turned with respect to the paper-feed unit, and the print unit has an open state in which the print unit is remote from said table of the paper-feed unit and a closed state in which the print unit folds flat on the table of the paper-feed unit.

16 Claims, 39 Drawing Sheets

PRINTER HAVING A JOINT MECHANISM FOR FITTING A PAPER FEED UNIT

BACKGROUND OF THE INVENTION

The present invention relates to a printer having a table on which a notebook computer (notebook PC) can be placed.

With the recent prevalence of notebook computers, the demand for smaller ink-jet printers, thermal printers, serial dot-matrix impact printers and other printers occupying smaller space has been growing. Since printers must hold printing papers, the size of a printer depends on the size of the printing papers, to some extent. It has been very difficult to reduce the size and the occupying space of the printer.

SUMMARY OF THE INVENTION

It is an object of the present invention to provide a printer that occupies small space.

It is another object of the present invention to provide a printer that is able to fold flat.

According to the present invention, a printer for printing image on a paper according to the print data output from a notebook computer has a paper-feed unit including a paper holding section for holding the paper to be printed on and a table on which the notebook computer can be placed; a print unit including a print section for printing image according to the print data on a paper supplied from the paper-feed unit and a receiving section for receiving a printed paper; and a joint mechanism for fitting the print unit on the paper-feed unit. The joint mechanism includes a shaft on which said print unit is carried so as to be turned with respect to the paper-feed unit, and the print unit has an open state in which the print unit is remote from said table of the paper-feed unit and a closed state in which the print unit folds flat on the table of the paper-feed unit.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Preferred embodiments of the present invention will next be described with reference to the accompanying drawings.

First Embodiment

Figure 1:
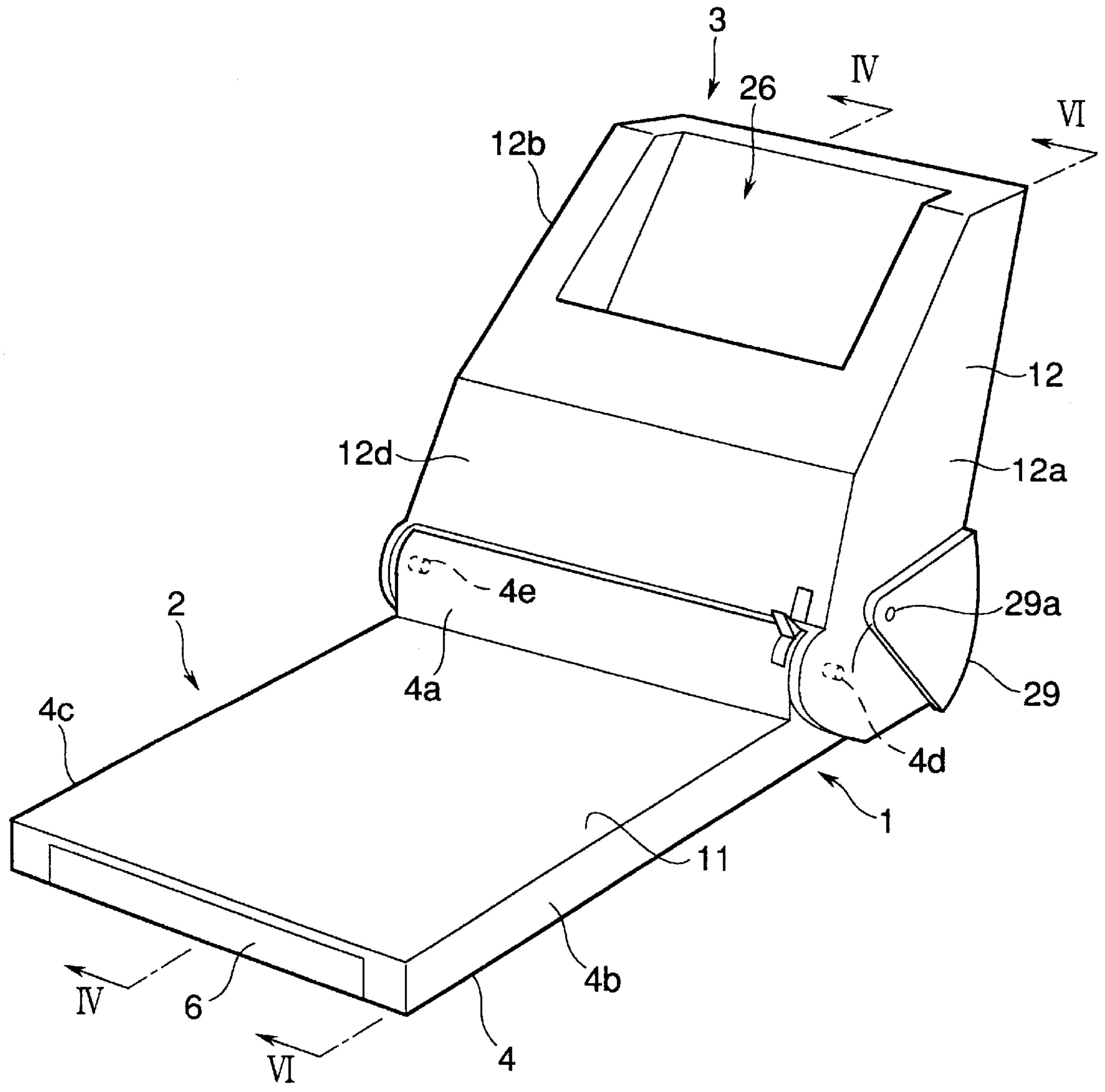
FIG. 1 is a perspective view of a printer in its unfolded state according to a first embodiment of the present invention.
Figure 2:
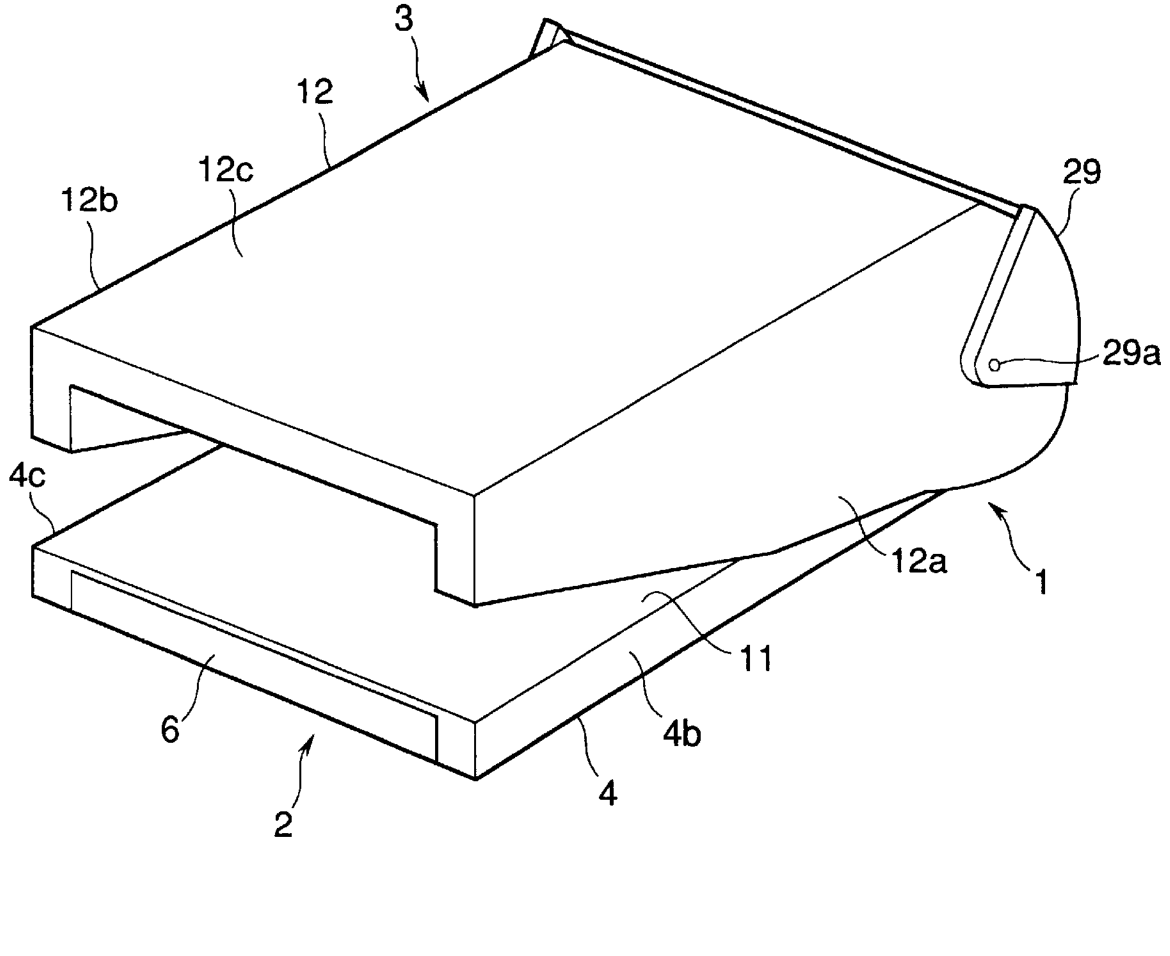
FIG. 2 is a perspective view of the printer in its folded state according to the first embodiment of the present invention.
Figure 3:
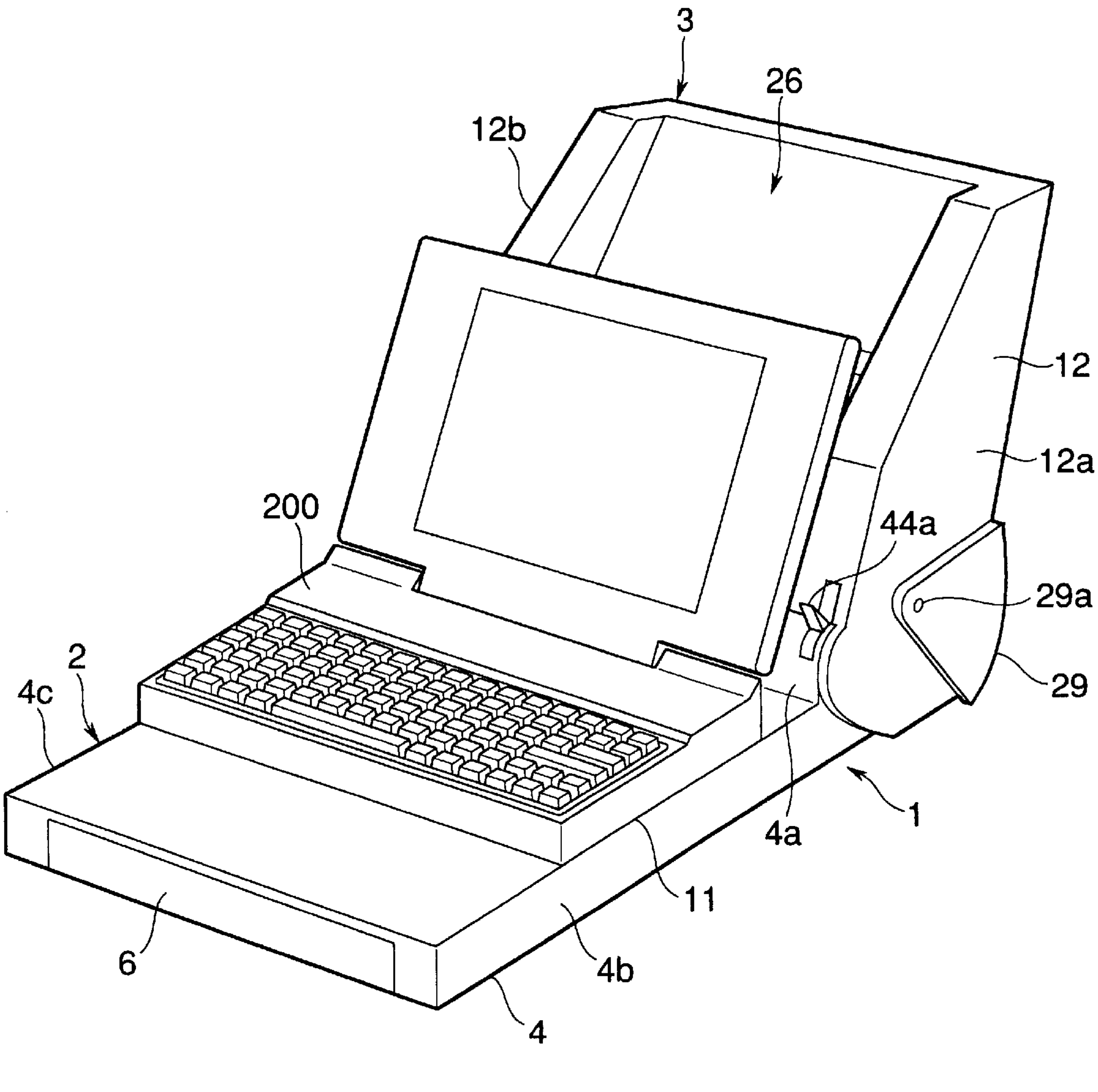
FIG. 3 is a perspective view of the printer shown in FIG. 1 with a notebook computer placed on its table.

FIGS. 1 and 2 are perspective views of a printer 1 according to a first embodiment of the present invention, wherein FIG. 1 shows the printer 1 in the unfolded state with a print unit 3 pulled open from a paper-feed unit 2, and FIG. 2 shows the printer 1 in the folded state (i.e., closed state), with the print unit 3 lying flat on the paper-feed unit 2. FIG. 3 is a perspective view showing the printer 1 in the unfolded state, with a notebook computer 200 to function as a data processing device placed on a table 11 of the paper-feed unit 2.

As shown in FIGS. 1 to 3, the printer 1 of the first embodiment has the paper-feed unit 2 and the print unit 3.

The paper-feed unit 2 has a frame section 4 into which a paper cassette 6 holding printing papers 8 (not shown in FIGS. 1 to 3) is inserted. As shown in FIG. 1, the frame section 4 is a flat box having a top plate (table 11) on which the notebook computer 200 (shown in FIG. 3) can be placed, a raised section 4*a* covering a paper supply mechanism, a bottom plate (not shown in FIGS. 1 to 3), and side walls 4*b* and 4*c* that connect the top plate and the bottom plate. The side walls 4*b* and 4*c* are respectively provided with shafts 4*d* and 4*e* that rotatably support the print unit 3. The table 11 formed by the flat top plate of the paper-feed unit 2 has almost the same width as the notebook computer 200, as shown in FIG. 3.

The print unit 3 has a frame section 12 which is rotatably supported by the shafts 4*d* and 4*e* provided on the paper-feed unit 2. The frame section 12 has side walls 12*a* and 12*b* with depressed sections (not shown in the figures) into which the shafts 4*d* and 4*e* are fit, a back plate 12*c*, and a front plate 12*d*. The frame section 12 also has an output tray (i.e., stacker) 26 for holding printed papers and contains a print section and a paper transport mechanism. The side walls 12*a* and 12*b* of the frame section 12 are respectively provided with shaft supporting holes 12*i* and 12*j* (shown in FIG. 10) which rotatably support shafts 29*a* and 29*b* of a rotary cover 29.

Figure 4:
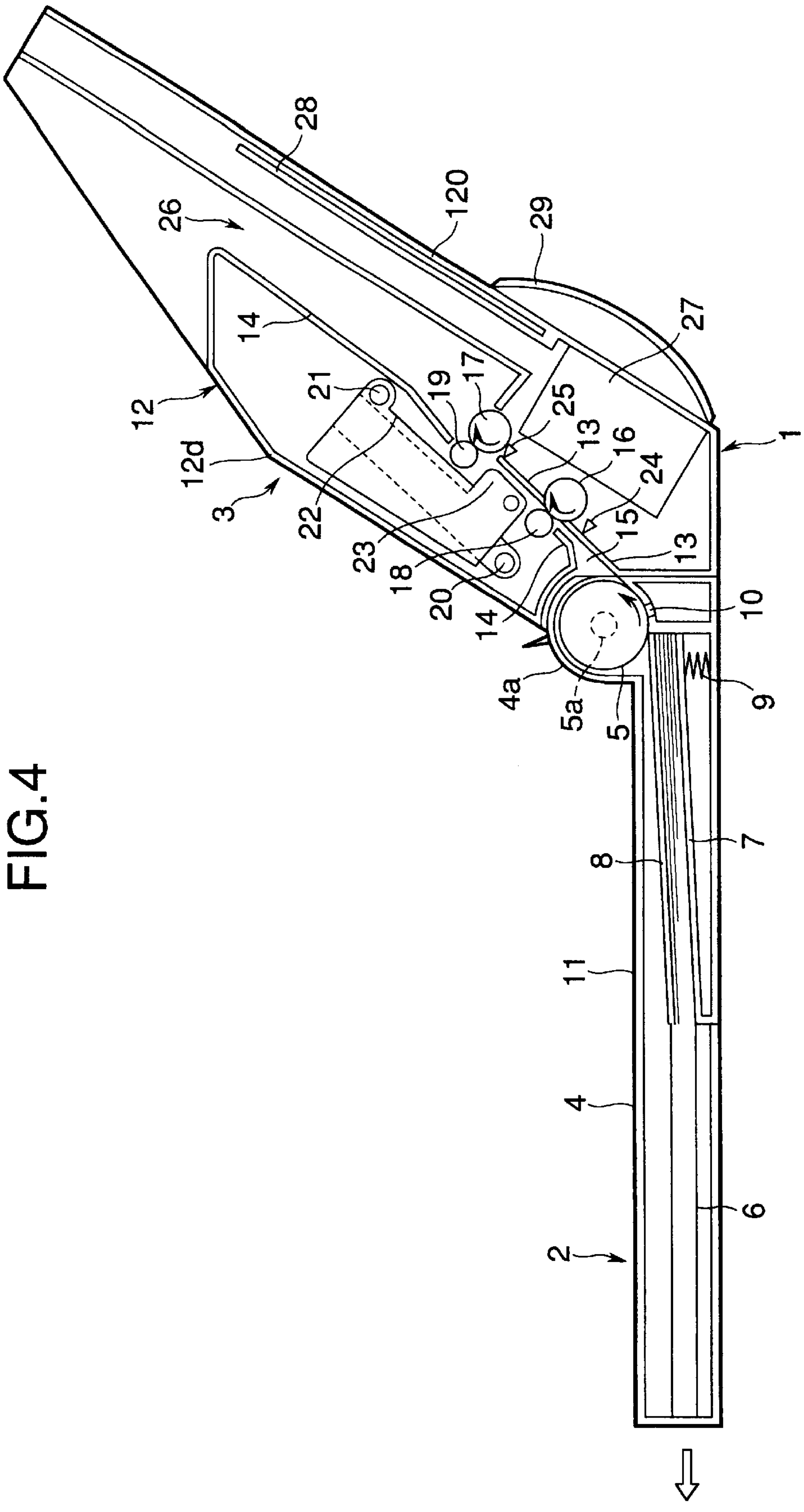
FIG. 4 is a sectional view taken along the line IV—IV indicated in FIG. 1.

FIG. 4 is a schematic cross section taken along the line IV—IV indicated in FIG. 1, and mainly shows the paper supply mechanism and the paper transport mechanism of the printer 1. As indicated in FIG. 4, the raised section 4*a* on the frame section 4 of the paper-feed unit 2 covers a paper-feed roller 5 that is secured on a shaft 5*a* so as to be rotated. The shaft 5*a* of the paper-feed roller 5 is rotatably supported on both side walls 4*b* and 4*c* of the frame section 4. The paper-feed unit 2 contains the paper cassette 6, which can be pulled, to the left as illustrated in FIG. 4. When the paper cassette 6 is inserted into the frame section 4, the paper 8 is placed on a spring board 7 provided in the frame section 4. A spring 9 urges the spring board 7 upward, pressing the printing papers 8 piled up on the spring board 7 against the paper-feed roller 5. Under the paper-feed roller 5, a separator 10 is provided to separate the supplied papers 8 one by one.

The central axis of the shafts 4*d* and 4*e* secured on the side walls 4*b* and 4*c* of the paper-feed unit 2 is in line with the central axis of the shaft 5*a* of the paper-feed roller 5. The frame section 12 contains a lower paper guide 13 and an upper paper guide 14, which form a paper path 15. Along the paper path 15, a resist roller 16 and a feed roller 17 are rotatably disposed. The resist roller 16 presses against a pressure roller 18, and the feed roller 17 presses against a spur gear 19.

The frame section 12 also contains two guide shafts 20 and 21 which are disposed perpendicular to the paper transport direction. A carriage 22 incorporating an ink-jet print head 23 is fit on the guide shafts 20 and 21 so as to be slid thereon. When passing a position facing the carriage 22, the paper 8 is printed by the ink-jet print head 23. In the upstream vicinity of the resist roller 16 and the feed roller 17 with respect to the paper transport direction, paper detection sensors 24 and 25 are disposed respectively.

The output tray 26 for holding printed papers 8 is provided downstream from the feed roller 17 in the paper transport direction. The feed roller 17 and the spur gear 19 eject the printed paper 8 into the output tray 26. A power supply section 27 is provided near the back plate 12*c* of the frame section 12 in the print unit 3. A control printed circuit board 28 is disposed below the output tray 26. The rotary cover 29 is rotatably disposed outside the bottom end of the frame section 12.

Figure 5:
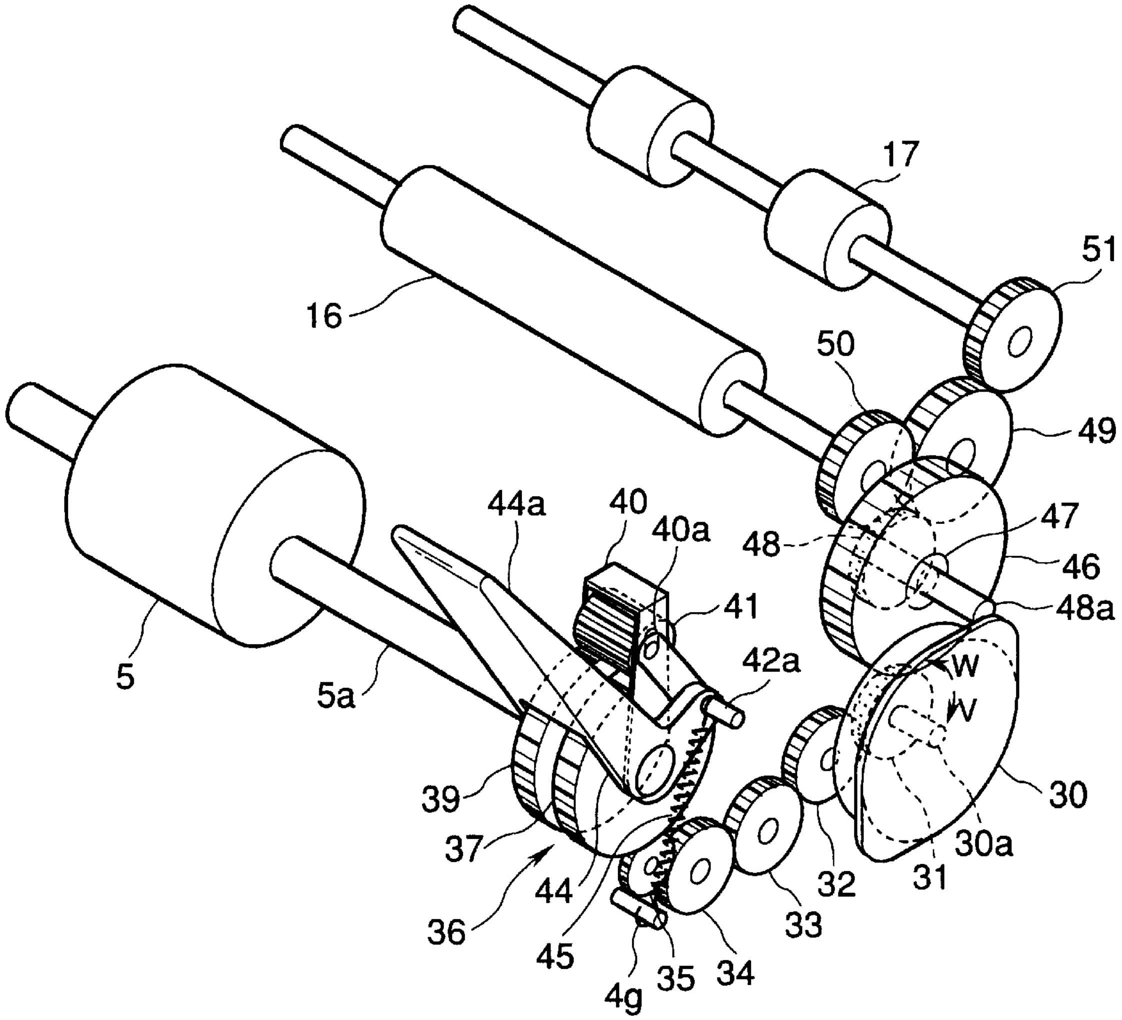
FIG. 5 is a perspective view schematically showing the structure of the paper-feed power transmission system of the printer shown in FIG. 1.
Figure 6:
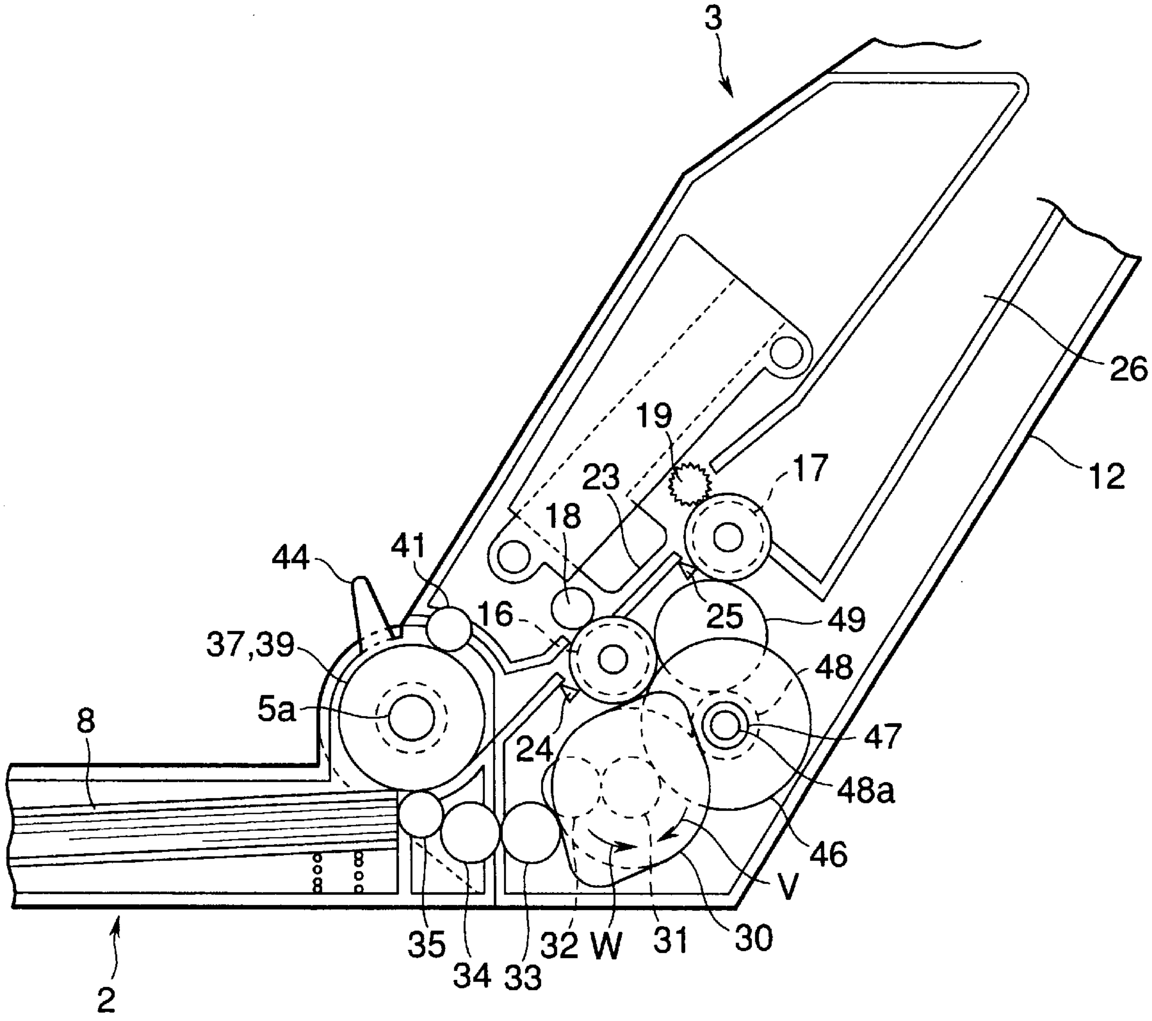
FIG. 6 is a sectional view taken along the line VI—VI indicated in FIG. 1.

FIG. 5 is a perspective view schematically illustrating the configuration of the mechanism for driving the paper supply mechanism and the paper transport mechanism in the first embodiment. FIG. 6 shows a schematic cross section taken along the line VI—VI indicated in FIG. 1.

The feed motor 30 shown in FIGS. 5 and 6 is the source of the paper-feed power and is secured on the frame section 12. The drive gear 31 secured on the rotary shaft 30*a* of the feed motor 30 engages with an idle gear 32, the idle gear 32 with another idle gear 33, the idle gear 33 with a still another idle gear 34, and the idle gear 34 with a further idle gear 35. These idle gears 32, 33, 34 and 35 are rotatably fit on corresponding posts provided on the frame section 12, which are not shown in the figures. The idle gear 35 engages with an intermediate gear 37 of a power switching section 36.

Figure 7:
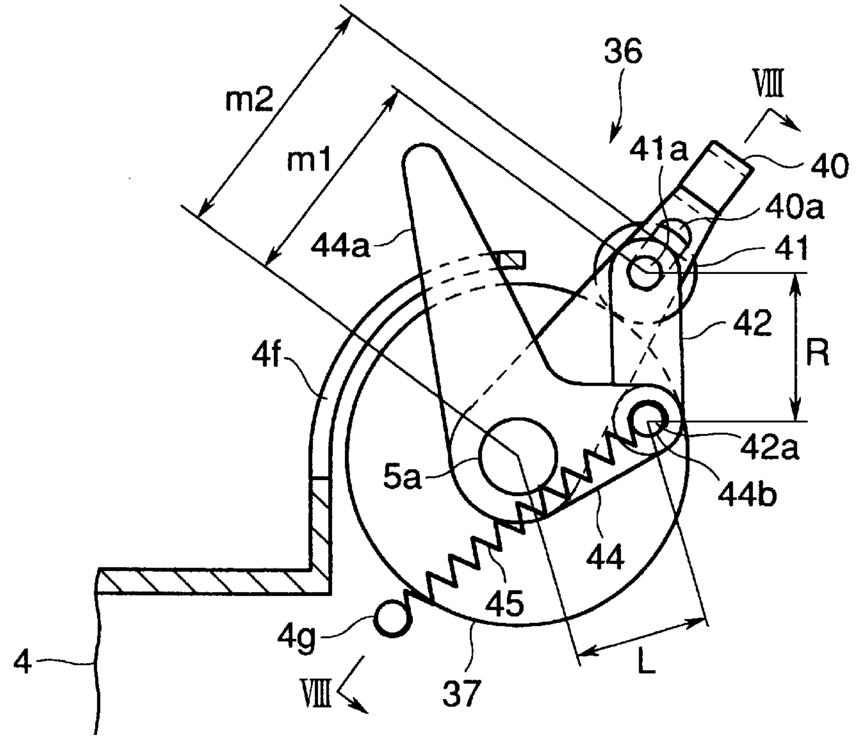
FIG. 7 is a side view of the power switching section of the paper-feed power transmission system shown in FIG. 5.
Figure 8:
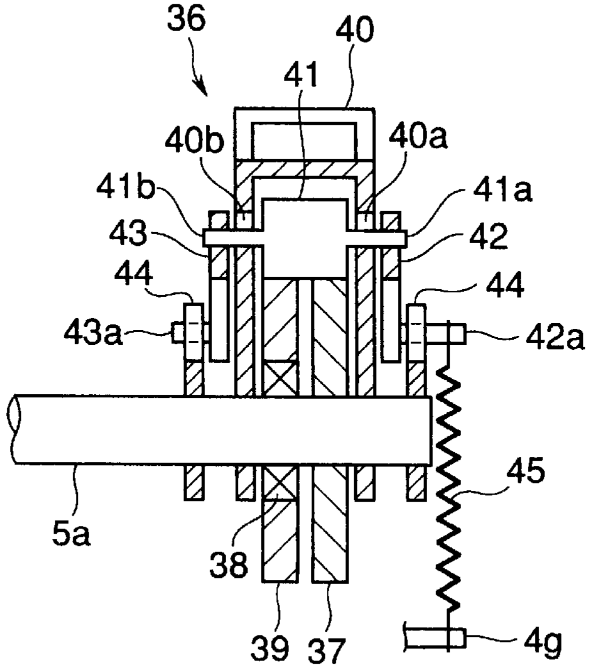
FIG. 8 is a sectional view taken along the line VIII—VIII, of the power switching section shown in FIG. 7.

Referring to FIGS. 7 and 8, the power switching section 36 is described here. FIG. 7 is a side view of the power switching section 36, and FIG. 8 is a sectional view taken along the line VIII—VIII indicated in FIG. 7. As shown in FIG. 7 or 8, the shaft 5*a* of the paper-feed roller 5 carries the intermediate gear 37 rotatably provided on it. Next to the intermediate gear 37, a first one-way gear 39 incorporating a one-way clutch 38 is provided. The first one-way gear 39 has almost the same outer diameter as the intermediate gear 37. When the first one-way gear 39 turns in a counterclockwise direction illustrated in FIG. 7, the one-way clutch 38 engages with the shaft 5*a* and rotates the shaft 5*a*. On the other hand, when the first one-way gear 39 turns in a clockwise direction illustrated in FIG. 7, the one-way clutch 38 does not engage with the shaft 5*a* and does not rotate the shaft 5*a*.

A U-shaped bracket 40 is rotatably fit on the shaft 5*a* so as to lie astride the intermediate gear 37 and the first one-way gear 39. The bracket 40 is secured by a stopper, which is not shown, provided on the frame section 4 so as not to rotate. The bracket 40 has a pair of elongated circular holes 40*a* and 40*b*, where the shafts 41*a* and 41*b* of the relay gear 41 engaging with both the intermediate gear 37 and the first one-way gear 39 are rotatably supported respectively. Outside the bracket 40, a pair of links 42 and 43 are provided with their ends rotatably fit on the shafts 41*a* and 41*b* of the relay gear 41. The other ends of the links 42 and 43 are provided with posts 42*a* and 43*a* respectively. L-shaped arms 44 are rotatably fit on the shaft 5*a* and placed outside the links 42 and 43. L-shaped arms 44 are rotatably fit on the posts 42*a* and 43*a*. The knob 44*a* on the L-shaped arm 44 extends outward from the opening 4*f* of a certain length formed on the raised section 4*a* of the frame section 4, allowing operation from the outside.

With reference to FIG. 7, the relationships between the bracket 40, the links 42 and 43, and the L-shaped arm 44 in length are described here. The following expressions (2) and (3) represent the relationships:

$$m1 \leqq P1+P3 \quad (2)$$

$$m2>R+L>P2+P4 \quad (3)$$

where, with respect to the bracket 40, m1 is the distance from the center of the hole in which the shaft 5*a* fits to the center of the inner arc of the elongated circular holes 40*a* and 40*b*, and m2 is the distance from the center of the hole in which the shaft 5*a* fits to the center of the outer arc of the elongated circular holes 40*a* and 40*b*; with respect to the links 42 and 43, R is the distance from the posts 41*a* and 41*b* to the posts 42*a* and 43*a*; with respect to the L-shaped arm 44, L is the distance from the center of the shaft 5*a* to the posts 42*a* and 43*a*; P1 is a half of the pitch diameter of the intermediate gear 37 and the first one-way gear 39; P2 is a half of the outer diameter of the intermediate gear 37 and the first one-way gear 39; P3 is a half of the pitch diameter of the relay gear 41; and P4 is a half of the outer diameter of the relay gear 41.

To the post 42*a* provided on the link 42 so as to pass through a through-hole 44*b* formed in the L-shaped arm 44, an end of a coil spring 45 is connected. The other end of the coil spring 45 is connected to a post 4*g* provided on the frame section 4 of the paper-feed unit 2. The post 4*g* is provided on a line that is the extension of a line connecting the center of the shaft 5*a* supporting the bracket 40 and the center of the elongated circular hole 40*a*. This coil spring 45 urges the relay gear 41 to the intermediate gear 37 and the first one-way gear 39. In the position illustrated in FIG. 7, the coil spring 45 exerts a force to rotate the L-shaped arm 44 clockwise while the knob 44*a* touching the upper end of the opening 4*f* of the frame section 4 of the paper-feed unit 2 hinders the rotation.

Figure 9:
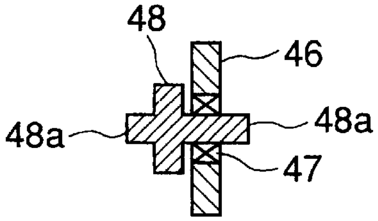
FIG. 9 is a sectional view of the one-way gear used in the paper-feed power transmission system shown in FIG. 7.

As shown in FIGS. 5 and 6, the drive gear 31 secured on the rotary shaft 30*a* of the feed motor 30 engages with a second one-way gear 46. The second one-way gear 46 incorporates a one-way bearing 47 that locks the shaft 48*a* rotating in a clockwise direction illustrated in FIG. 5. The second one-way gear 46 is provided on the shaft 48*a* of a relay gear 48. The shaft 48*a* of the relay gear 48 is held by supports, which are not shown in the figures, formed on the frame section 12 of the print unit 3. FIG. 9 is a cross section of the second one-way gear 46 and the second relay gear 48. As shown in the figure, the one-way bearing 47 is provided between the second one-way gear 46 and the shaft 48*a*. The second relay gear 48 and the shaft 48*a* are integrally formed.

Referring to FIGS. 5 and 6 again, the relay gear 48 engages with an idle gear 49, which engages with a resist roller gear 50 and a feed roller gear 51. The resist roller gear 50 is secured on the shaft of the resist roller 16, and the feed roller gear 51 is secured on the shaft of the feed roller 17.

Figure 10:
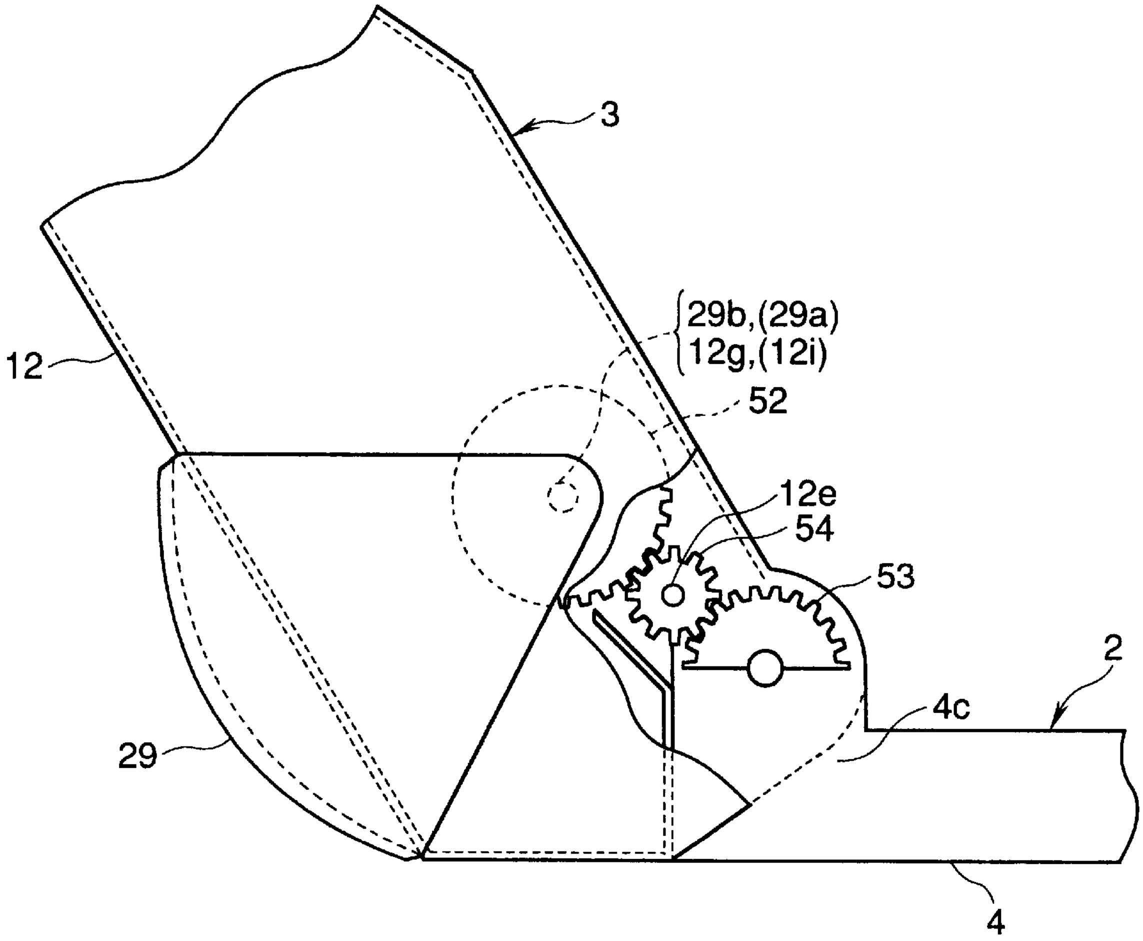
FIG. 10 is a side view of the drive mechanism of the rotary cover of the printer shown in FIG. 1, with parts cut away.

With reference to FIG. 10, the configuration of the rotary cover 29 is described here. FIG. 10 is a side view of the rotary cover 29 in the first embodiment which shows the side opposite to the side shown in FIG. 4. As shown in FIG. 10, the rotary cover 29 is provided on both sides of the frame section 12 of the print unit 3 and is shaped almost like a letter U. The rotary cover 29 has rotary shafts 29*a* and 29*b* inside its right and left sides. The rotary shafts 29*a* and 29*b* are rotatably fit into shaft supporting holes 12*i* and 12*j* formed on the side faces of the frame section 12. The rotary shaft 29*b* on the left side (shown in FIG. 10) of the rotary cover 29 passes through the shaft supporting hole 12*j* and extends to the inside of the frame section 12. The rotary cover gear 52 is secured to the projected rotary shaft 29*b*.

A fan-shaped gear 53 is integrally formed on the outer surface of the left side wall 4*c* of the frame section 4 of the paper-feed unit 2. An idle gear 54 that engages with the fan-shaped gear 53 and the rotary cover gear 52 is rotatably provided between the gears 52 and 53. The idle gear 54 is fit on the shaft 12*e* provided on the frame section 12.

Figure 11:
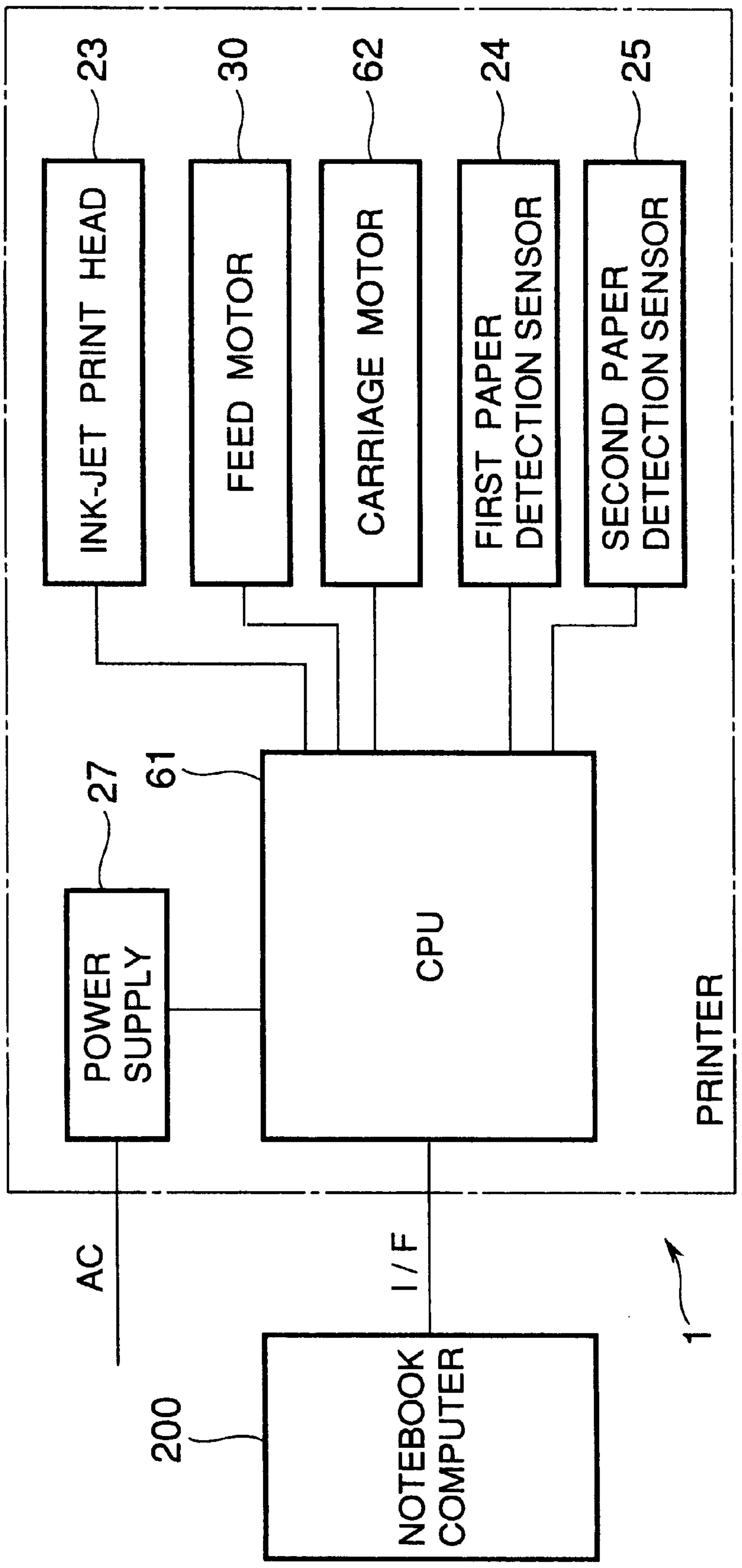
FIG. 11 is a block diagram showing the configuration of the control system of the printer shown in FIG. 1.

FIG. 11 is a block diagram indicating the configuration of the control system of the printer of the first embodiment. With reference to FIG. 11, a control unit (CPU) 61 controls the whole operation of the printer 1 and is made up of the microprocessor and other components mounted on the control printed circuit board 28. Power to the control unit 61 is supplied by the power supply section 27. To the control unit 61, the ink-jet print head 23, the feed motor 30, a carriage motor 62, a first paper detection sensor 24, and a second paper detection sensor 25 are connected. The carriage motor 62 is used to slide the carriage 22 shown in FIG. 4 along the guide shafts 20 and 21. When connected to the notebook computer 200, the control unit 61 can receive print data from the notebook computer 200.

The printer 1 of the first embodiment carries out print operation as described here. As shown in FIG. 3, the notebook computer 200 is first placed on the table 11 of the paper-feed unit 2, then connected to the printer 1 by a cable or other means. The notebook computer 200 is operated to send the print data to the printer 1.

The control unit 61 first rotates the feed motor 30 in a clockwise direction (as illustrated by the arrow V in FIG. 5). This rotation is transmitted through the idle gears 32, 33, 34 and 35, the intermediate gear 37, and the relay gear 41 to the first one-way gear 39 and the first one-way gear 39 rotates in a counterclockwise direction illustrated in FIG. 5. With the first one-way gear 39, the paper-feed roller 5 rotates in the same direction, supplying the papers 8 held in the paper cassette 6 one by one. When the feed motor 30 rotates clockwise, the second one-way gear 48 idles, stopping the resist roller 16 and the feed roller 17. The supplied paper 8 is guided into the paper path 15, and the first paper detection sensor 24 detects the front end of the paper 8.

After a lapse of a certain time from when the front end of the paper 8 is detected, the control unit 61 stops the feed motor 30. This slackens the paper 8 with its front end stopped at the contact position of the resist roller 16 and the pressure roller 18. The control unit 61 next rotates the feed motor 30 in the opposite direction (as illustrated by the arrow W indicated in FIG. 5). The rotation is transmitted through the second one-way gear 46, the relay gear 48, and the idle gear 49 to the resist roller gear 50 and the feed roller gear 51 and the gears 50, 51 rotate in a clockwise direction illustrated in FIG. 5. With the counterclockwise rotation of the feed motor 30, the first one-way gear 39 idles, stopping the paper-feed roller 5. When the resist roller gear 50 and the feed roller gear 51 rotate, the paper 8 touching the resist roller 16 is guided to travel through the paper path 15. Skew, if any, of the paper 8 is corrected at this stage.

When the print start position on the paper 8 reaches a position facing the ink-jet print head 23, the paper is stopped to be printed on. For the print operation, the control unit 61 controls the carriage motor 62 to slide the ink-jet print head 23 in the printing direction while feeding the paper 8 up a discrete number of lines. When the print operation is completed, the feed roller 17 and the spur gear 19 eject the printed paper 8 into the output tray 26. The ejection of the printed paper 8 into the output tray 26 is detected by the second paper detection sensor 25. When multiple papers 8 are printed, the operation described above is repeated. After all print operation is completed, the power is turned off.

Figure 12A:
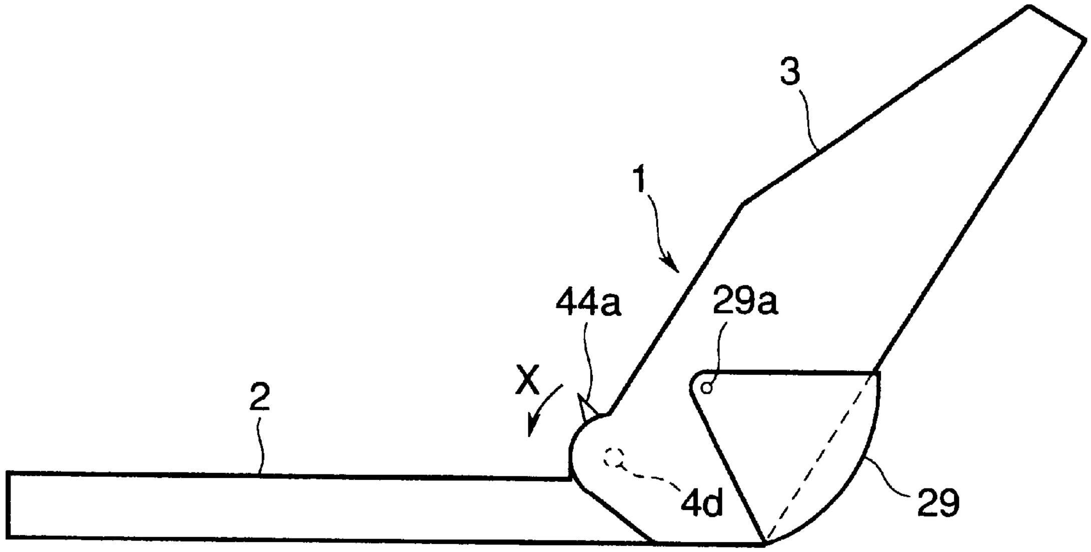
FIGS. 12A to 12D are side views illustrating how the printer shown in FIG. 1 folds.
Figure 12B:
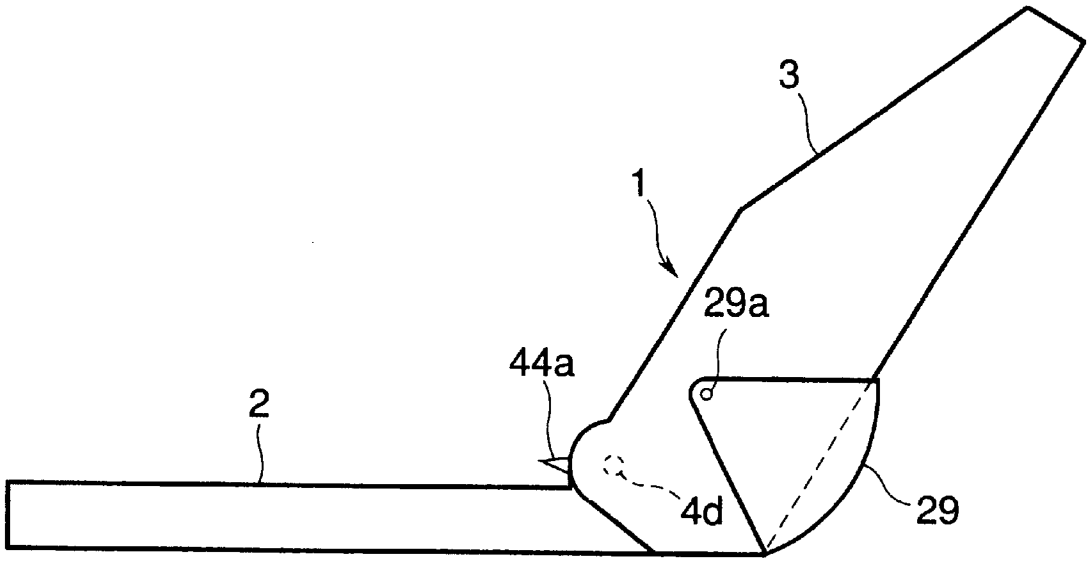
Figure 12C:
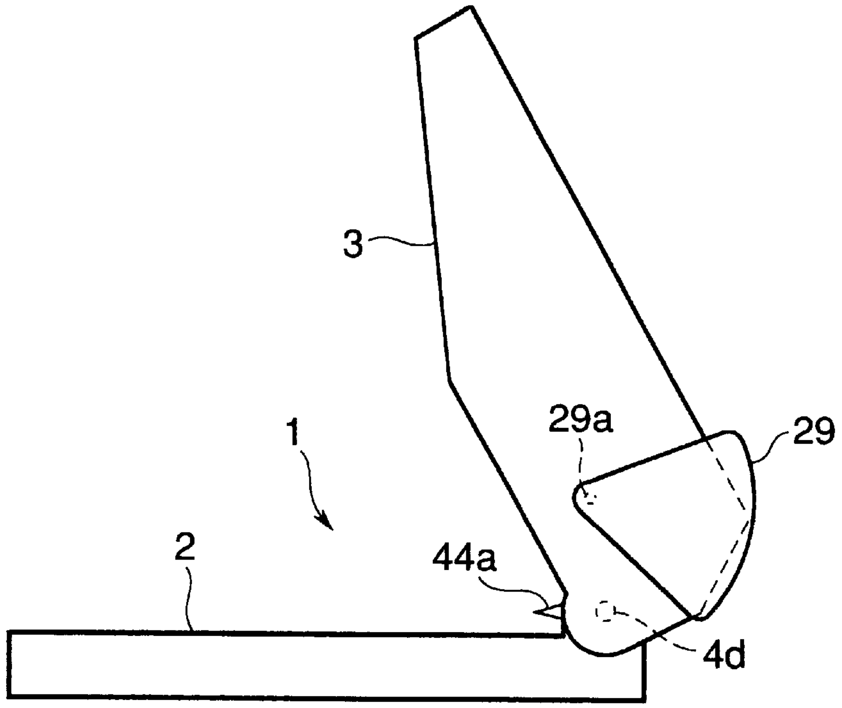
Figure 12D:
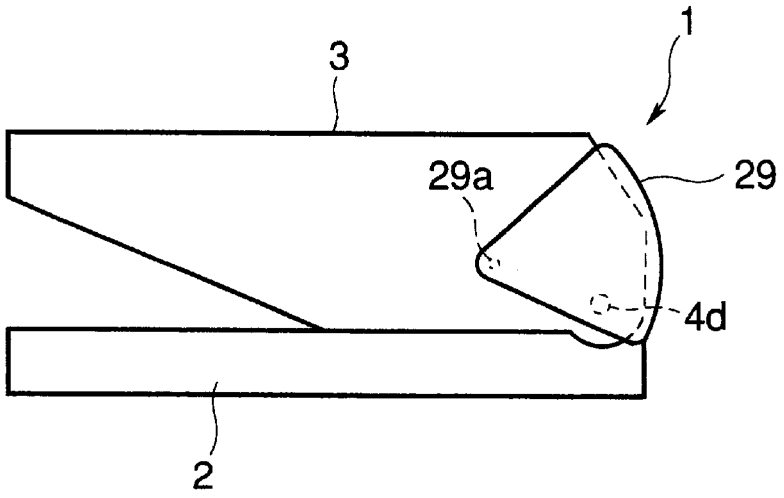
Figure 13A:
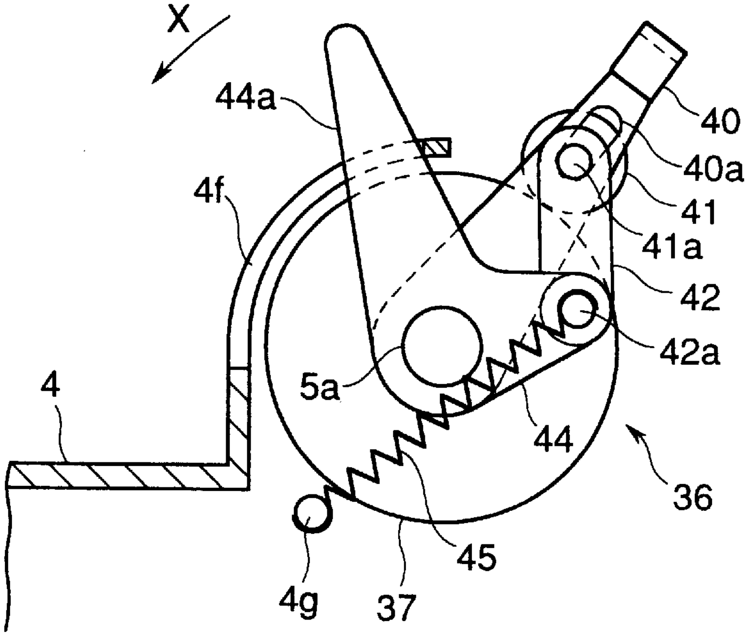
FIGS. 13A to 13C illustrate the operation of the power switching section shown in FIG. 8.
Figure 13B:
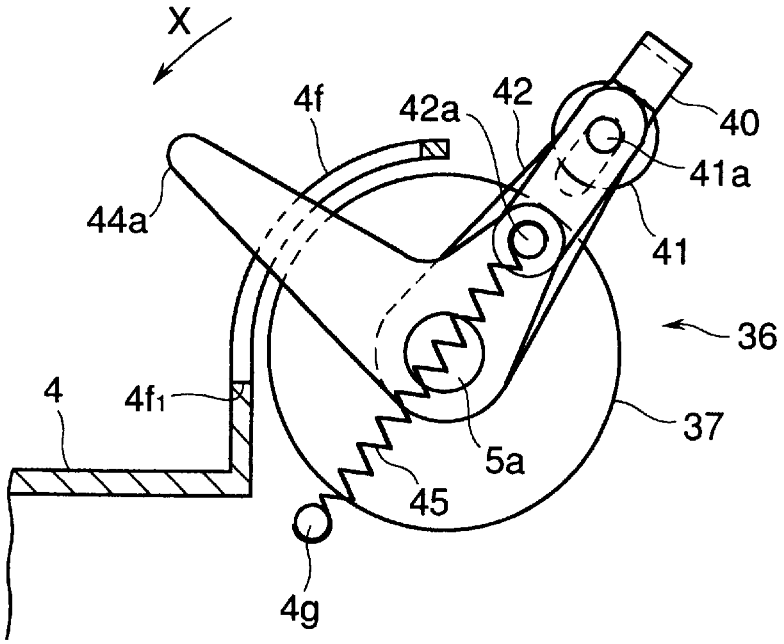
Figure 13C:
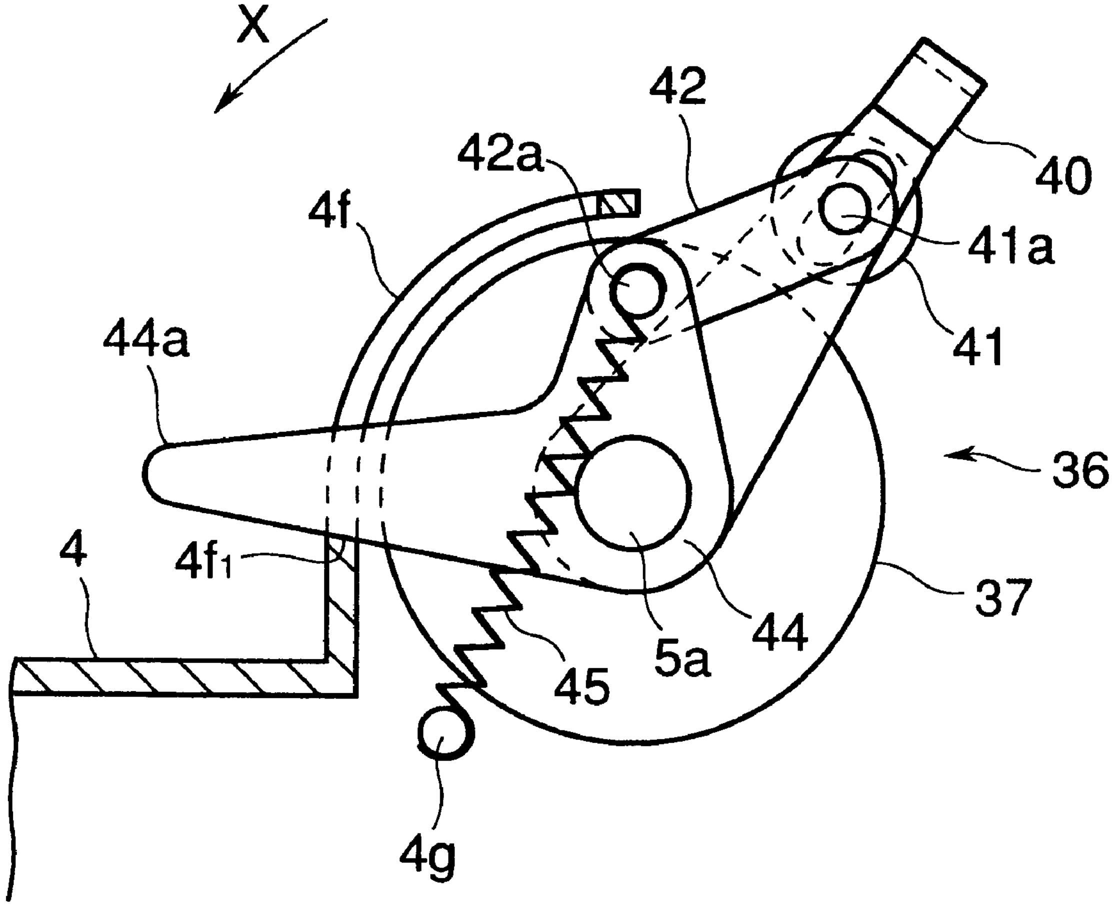

Referring to FIGS. 12A to 12D and 13A to 13C, the folding of the print unit 3 of the printer 1 is described here. The notebook computer 200 is first removed from the printer 1. The knob 44*a* of the L-shaped arm 44 is turned in a counterclockwise direction (as illustrated by the arrow X), as shown in FIGS. 12A and 12B. This movement of the knob 44*a* is detailed in FIGS. 13A, 13B and 13C. When the knob 44*a* reaches the position indicated in FIG. 13B, the L-shaped arm 44 and the links 42 and 43 are aligned. Beyond the position, the L-shaped arm 44 is urged counterclockwise by the coil spring 45. When the knob 44*a* comes into contact with the lower end 4*f*1 of the opening 4*f*, as shown in FIG. 13C, the L-shaped arm 44 stops. Meanwhile, the relay gear 41 held by the bracket 40 is lifted by the L-shaped arm 44 and links 42 and 43, and is disengaged from the intermediate gear 37 and the first one-way gear 39. The lengths of the L-shaped arm 44 and links 42 and 43 and the position of the lower end 4*f*1 are determined so that these gears are disengaged at the position indicated in FIG. 13C.

As shown in FIGS. 12C and 12D, the printer 1 is folded in two by turning the print unit 3 toward the paper-feed unit 2, about the shafts 4*d* and 4*e* of the frame section 4 of the paper-feed unit 2.

When the print unit 3 is turned, the idle gear 35 does not rotate on its axis but revolves around the intermediate gear 37 while meshing with it due to the static load of the feed motor 30 and the like. Since the intermediate gear 37 and the relay gear 41 are disengaged, the intermediate gear 37 rotates on its axis in a counterclockwise direction illustrated in FIG. 5. Consequently, the print unit 3 can be smoothly turned. Meanwhile, the paper-feed roller 5 is stopped and does not supply the paper 8 from the paper-feed unit 2.

Referring to FIG. 10, the idle gear 54 revolves clockwise around the fan-shaped gear 53, as the print unit 3 is turned. At the same time, the idle gear 54 rotates clockwise on its axis, causing the rotary cover gear 52 to rotate counterclockwise on its axis. The rotation of the rotary cover gear 52 causes the rotary cover 29 to turn counterclockwise on the rotary shafts 29*a* and 29*b*. In the completely folded state indicated in FIG. 12D, the rotary cover 29 can cover the back of the joint of the paper-feed unit 2 and print unit 3, which was exposed before.

In the folded state indicated in FIG. 12D, the L-shaped arm 44 may return to the position indicated in FIG. 13A, due to vibration or other factors. If this return occurs, the first one-way gear 39 and the relay gear 41 indicated in FIG. 5 engage with each other. The print unit 3, however, can be raised smoothly because the first one-way gear 39 idles when the print unit 3 is turned clockwise. During the raising of the print unit 3, the paper-feed roller 5 does not rotate and does not supply the paper 8.

A mechanism may be provided to lock the knob 44*a* of the L-shaped arm 44 while the printer 1 is in its folded state.

As has been described above, the printer according to the first embodiment requires a small space during printing since the printer 1 allows the notebook computer 200 to be operated to output the print data to be placed on its table 11 of the paper-feed unit 2. When not in use, the printer 1 can be folded in two for saving three-dimensional storage space and for keeping dust out.

Second Embodiment

A printer according to a second embodiment of the present invention will next be described.

Figure 14:
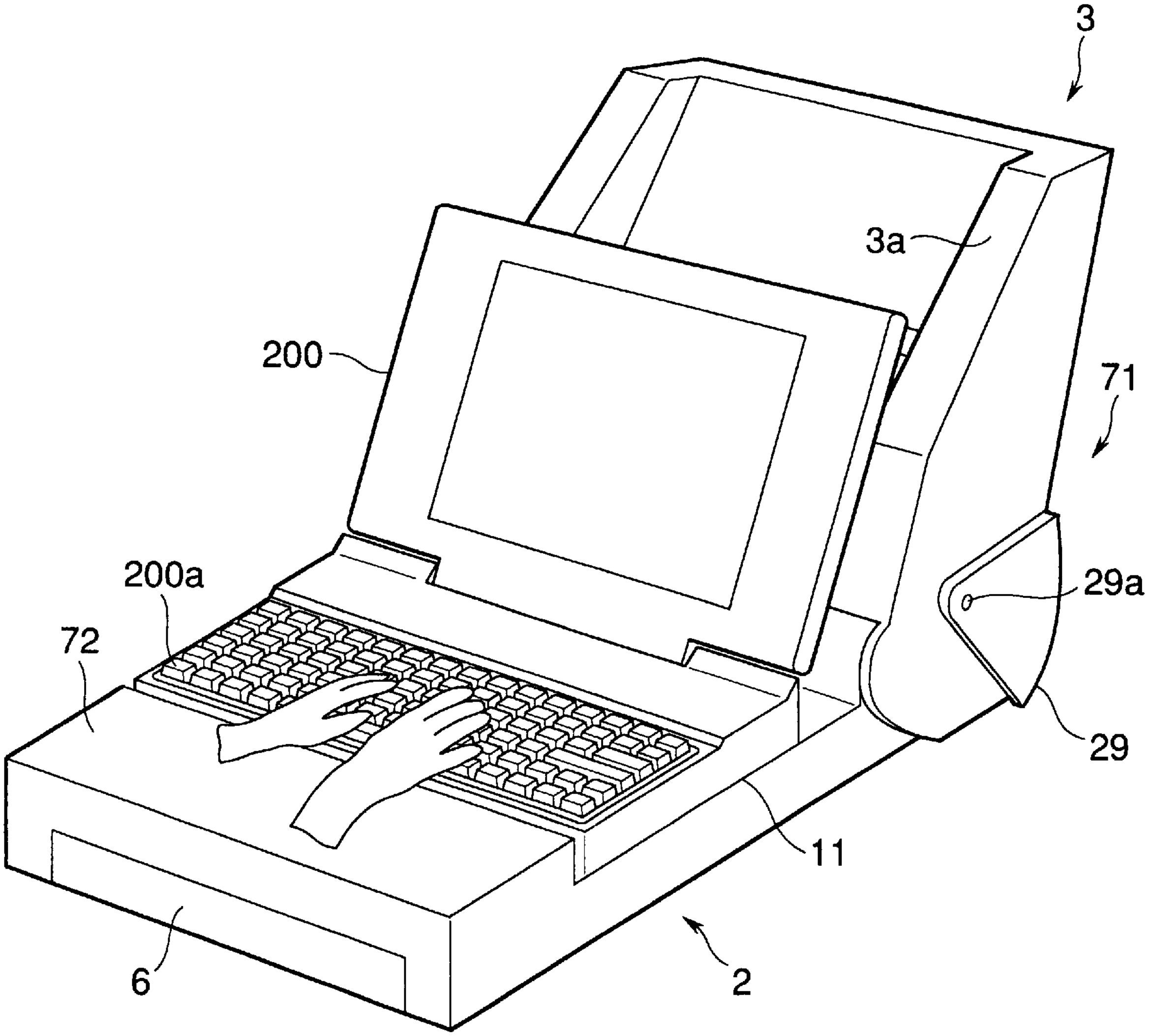
FIG. 14 is a perspective view of a printer according to a second embodiment of the present invention, with a notebook computer placed on its table.
Figure 15:
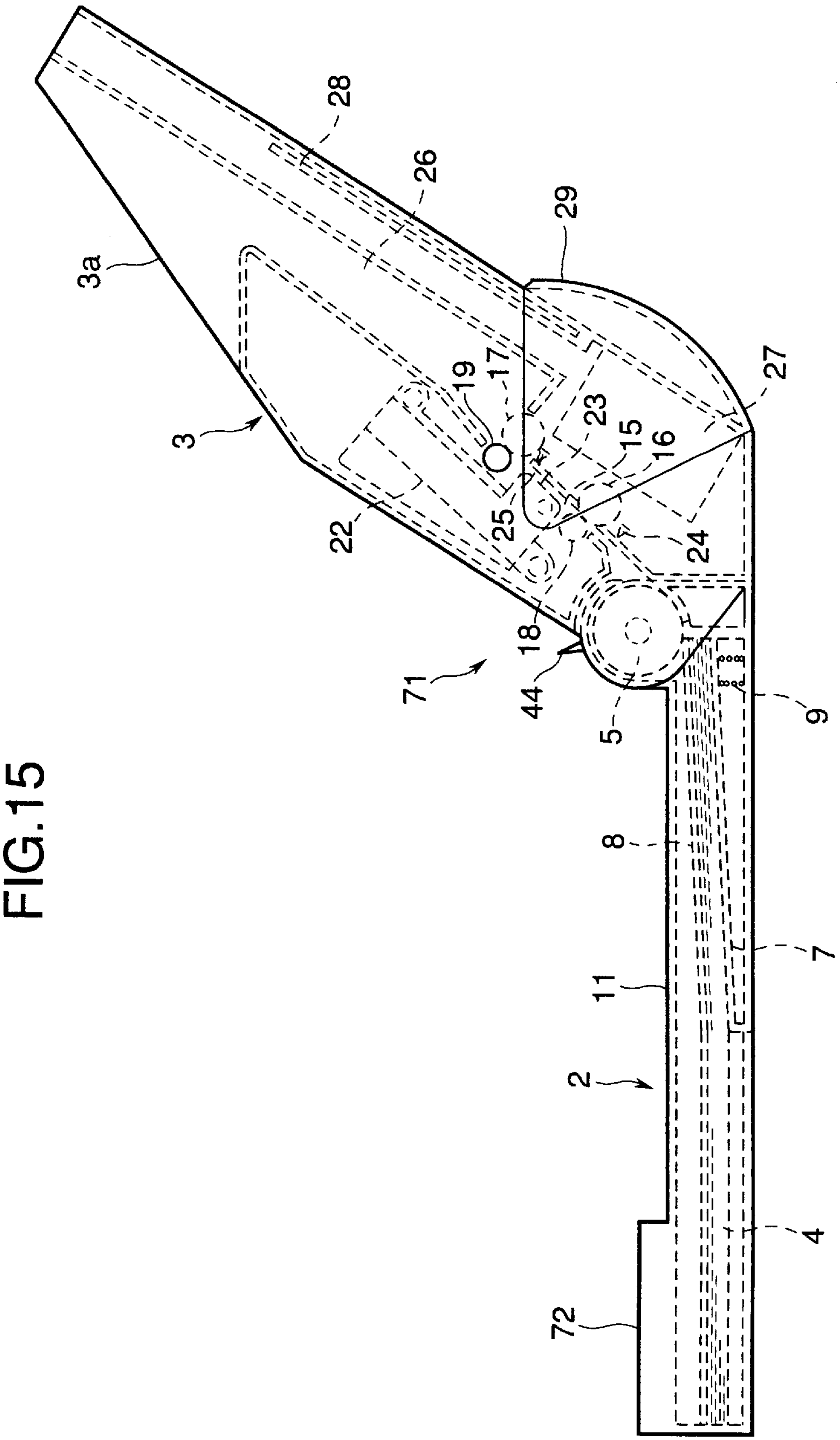
FIG. 15 is a side view of the printer shown in FIG. 14.

FIG. 14 is a perspective view of a printer 71 according to the second embodiment of the present invention, on which the notebook computer 200 is placed. FIG. 15 is a side view of the printer 71 of the second embodiment. In FIGS. 14 and 15, members identical to or corresponding to those of the printer 1 of the first embodiment are denoted by the same reference numerals. The printer 71 of the second embodiment is different from the printer 1 of the first embodiment only in that a support 72 for the operator's hands or wrists is formed next to the table 11 formed atop the paper-feed unit 2.

When the notebook computer 200 is placed on the table 11, the support 72 is close to the keyboard 200*a* of the notebook computer 200. The top surface of the support 72 is generally formed to be a little lower than or at the same level as the surface of the keyboard 200*a*. Since the print unit 3 has an inclined top surface 3*a*, the support 72 does not come into contact with the print unit 3 when the printer 71 is folded in two with the print unit 3 lying flat. The support 72 of the printer 71 of the second embodiment functions as a wristrest for the operator using the keyboard 200*a* of the notebook computer 200 placed on the table 11, and can mitigate tiredness of the operator. The first and second embodiments are the same except for the point described above.

Third Embodiment

A printer according to a third embodiment of the present invention will next be described.

Figure 16:
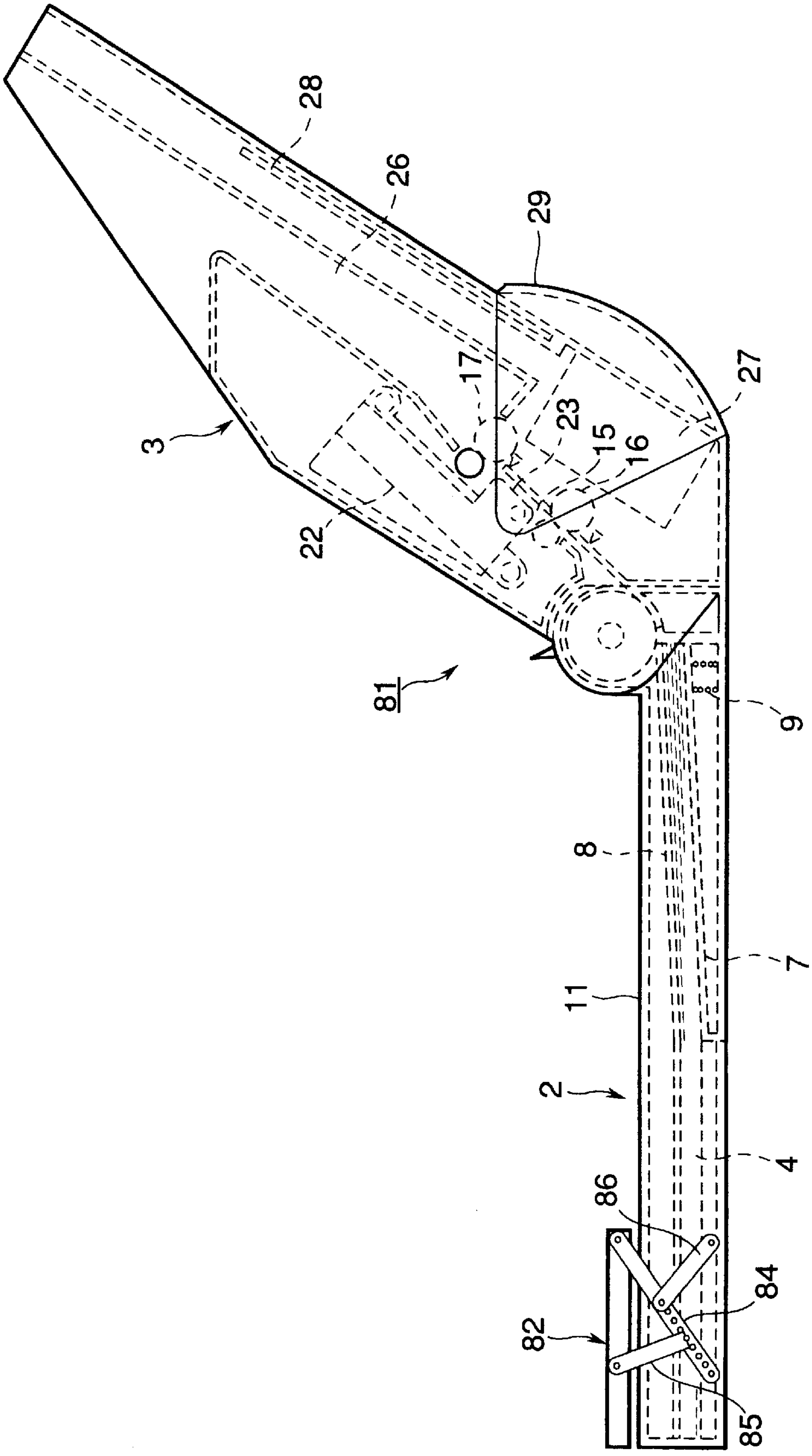
FIG. 16 is a side view of a printer according to a third embodiment of the present invention.
Figure 17:
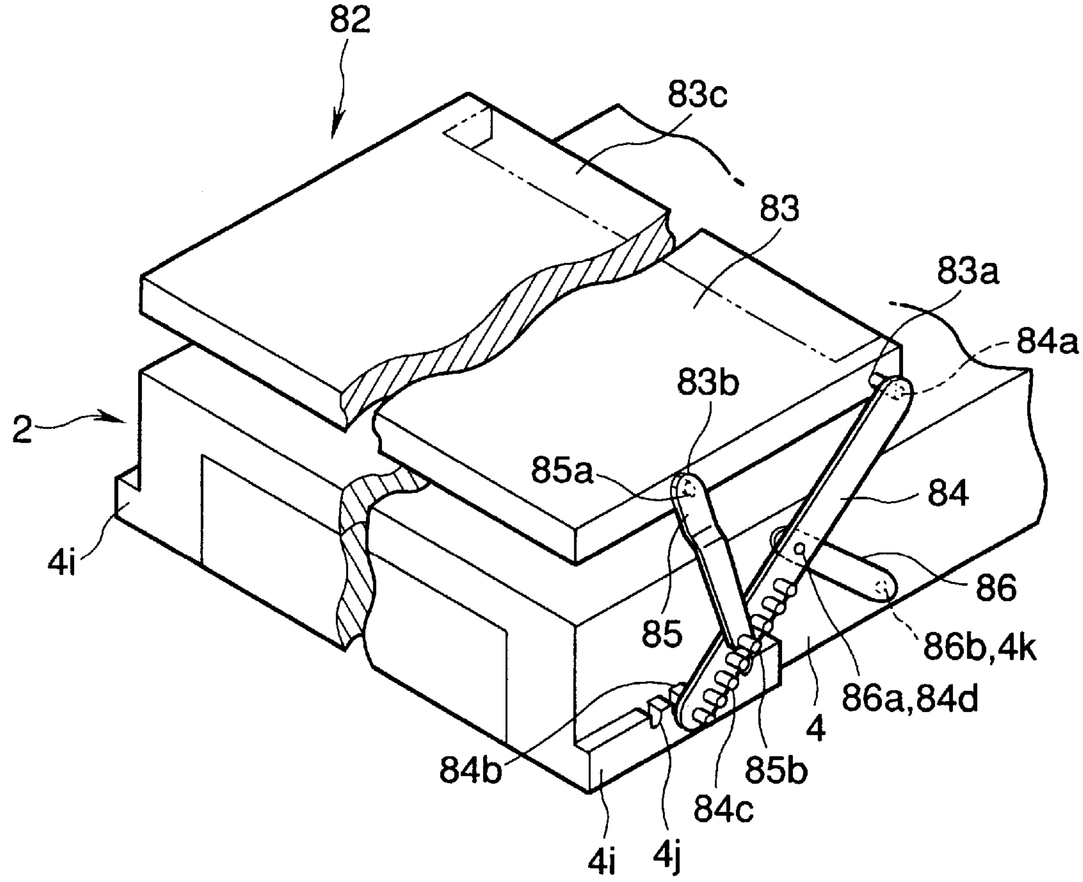
FIG. 17 is a perspective view of a support of the printer shown in FIG. 16, with parts cut away.

FIG. 16 is a side view of a printer 81 of the third embodiment. FIG. 17 is a perspective view showing the support 82 of the printer 81 of the third embodiment with parts cut away. In FIGS. 16 and 17, members identical to or corresponding to those of the printer 1 of the first embodiment are denoted by the same reference numerals. The printer 81 of the third embodiment is different from the printer 1 of the first embodiment only in that the printer 81 has a height-adjustable support 82 next to the table 11 formed atop the paper-feed unit 2.

With reference to FIGS. 16 and 17, the printer 81 of the third embodiment has the support 82 next to the table 11 on the paper-feed unit 2. The support 82 has a bed 83 on which the hands or wrists of the operator using the keyboard of the notebook computer 200 rest. The bed 83 has shaft supporting holes 83*a* and 83*b* on each of two opposite sides. FIG. 17 shows just the shaft supporting hole 83*b* on one side. The bed 83 also has a depressed area 83*c* formed along another deep side. A shaft 84*a* integrally formed on the upper end of a first link 84 is rotatably fit in the shaft supporting hole 83*a* while a shaft 85*a* integrally formed on the upper end of a third link 85 is rotatably fit in the shaft supporting hole 83*b*. A securing post 84*b* is formed inside the lower end of the first link 84. The frame section 4 of the paper-feed unit 2 has projected areas 4*i* on both sides. The projected area 4*i* has multiple securing grooves 4*j* on its top surface. The securing post 84*b* on the first link 84 is fit in one of the securing grooves 4*j*.

The first link 84 has multiple supporting posts 84*c* integrally formed at almost equal intervals on its outer surface of the lower part. The third link 85 has a U-shaped groove 85*b* at its lower end, which fits on one of the supporting posts 84*c*. At the center of the first link 84, a supporting hole 84*d* is formed. In the supporting hole 84*d*, a supporting post 86*a* formed on the upper end of a second link 86 is rotatably fit. The second link 86 is about half as long as the first link 84 and has a supporting post 86*b* formed on its lower end. The supporting post 86*b* is rotatably fit in a supporting hole 4*k* formed on a certain position at almost the same height as the securing grooves 4*j* on the frame section 4 described above. The other configuration of the printer of the third embodiment is the same as that of the first embodiment.

The print operation of the printer 81 and the folding of the print unit 3 of the third embodiment are the same as those of the first embodiment. Referring to FIGS. 18 to 21, the support 82 of the third embodiment is adjusted as will be described below. FIGS. 18 to 21 illustrate the height adjustment of the support 82 of the third embodiment.

Figure 18:
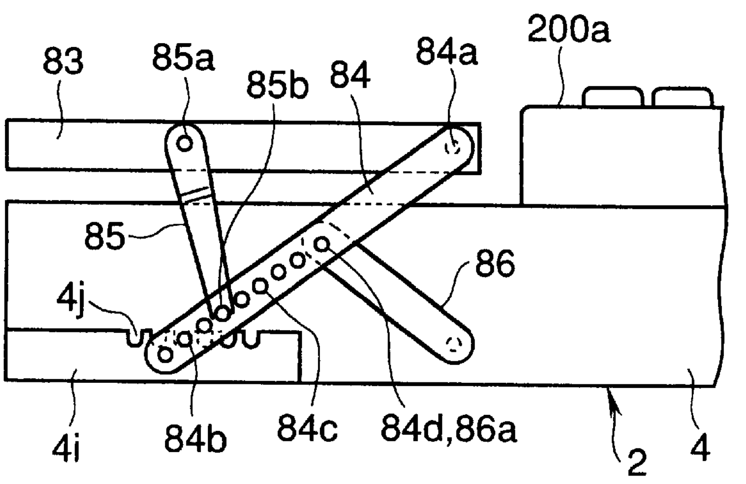
FIGS. 18 to 21 are side views of the support of the printer shown in FIG. 16.
Figure 19:
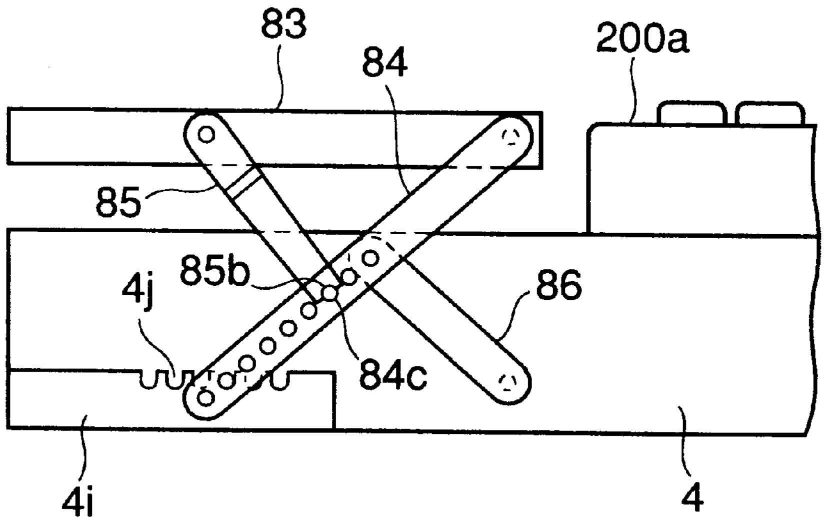
Figure 20:
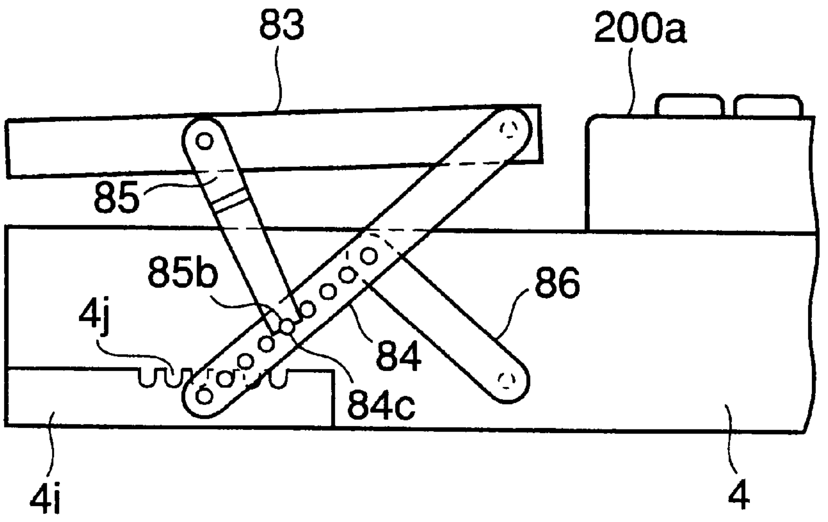

It is assumed that the notebook computer 200 is placed on the table 11 and that the bed 83 of the support 82 is set at the height indicated in FIG. 18. The top surface of the bed 83 is lower than the surface of the keyboard 200*a* of the notebook computer 200, which makes it hard to use the keyboard 200*a*. The bed 83 can be lifted up by fitting the securing post 84*b* of the first link 84 in another securing groove 4*j* closer to the keyboard 200*a* (a securing groove 4*j* to the right side, in FIG. 19). At the same time, the third link 85 is moved to fit the U-shaped groove 85*b* on a higher supporting post 84*c* provided on the first link 84. This operation raises the bed 83, keeping it in the horizontal position.

The bed 83 can be inclined with the side closer to the operator (left side in FIG. 20) lowered, by fitting the U-shaped groove 85*b* of the third link 85 on a lower supporting post 84*c*. That is, the bed 83 can be set at a desired angle by fitting the U-shaped groove 85*b* on the corresponding supporting post 84*c*.

Figure 21:
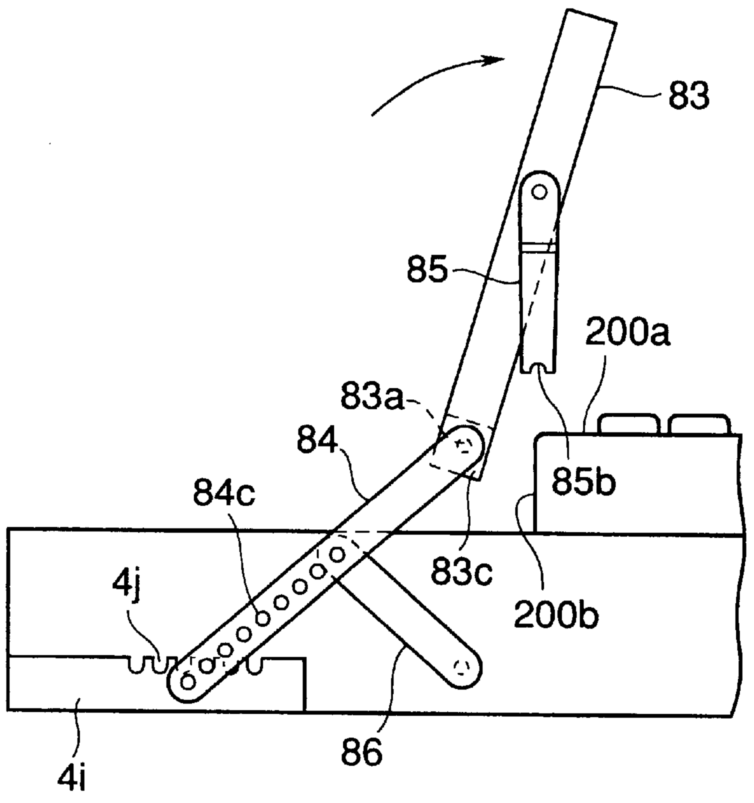

The notebook computer 200 may have an insertion slot for a floppy disk on its front face. When this type of notebook computer 200 is placed on the paper-feed unit 2, the support in front of the notebook computer 200 makes it hard to insert and eject a floppy disk. This trouble can be avoided by turning the bed 83 upward on the shaft supporting hole 83*a* to raise the side closer to the operator, as shown in FIG. 21. Since the obstacle before the front face 200*b* of the notebook computer 200 is removed, the floppy disk can be easily inserted and ejected. The bed 83 can be easily returned from the position shown in FIG. 21 to the original position by turning the bed 83 downward and fitting the U-shaped groove 85*b* of the third link 85 on the original supporting post 84*c*.

Figure 22:
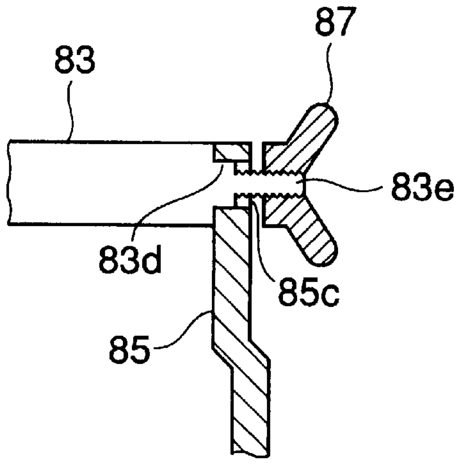
FIG. 22 is a sectional view of part of a modified support of the printer shown in FIG. 16.
Figure 23:
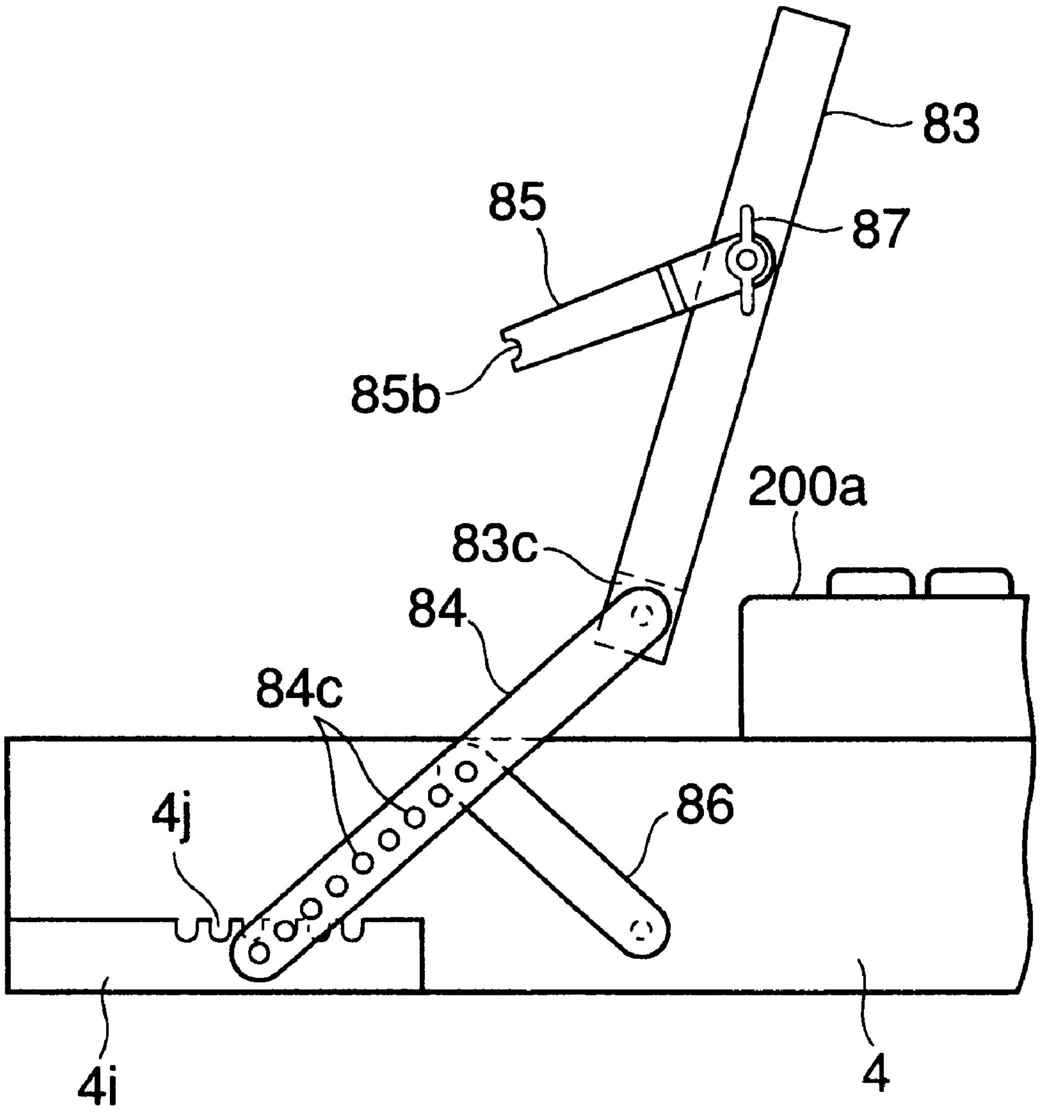
FIG. 23 is a side view of the modified support of the printer shown in FIG. 16.

The support 82 may be modified. FIGS. 22 and 23 show a cross section and a side view of a modified support 82 respectively. The modified support 82 shown in FIGS. 22 and 23 is different from the support 82 shown in FIGS. 17 to 21 just in the method in which the third link 85 is provided on the bed 83.

As shown in FIGS. 22 and 23, the bed 83 of the modified support 82 has a shoulder 83*d* slightly thinner than the third link 85 and an externally threaded projection 83*e*. On the shoulder 83*d*, the supporting hole 85*c* of the third link 85 is rotatably fit. On the externally threaded projection 83*e*, a thumbscrew 87 is fit. After the position of the bed 83 is adjusted, the thumbscrew 87 is fastened so that the third link 85 does not rotate with respect to the bed 83.

This configuration fixes the position of the third link 85 with respect to the bed 83. When the bed 83 is turned to its original position, as shown in FIG. 23, the U-shaped groove 85*b* of the third link 85 automatically fits on the original supporting post 84*c*. That is, the bed 83 of the modified support 82 can be very easily returned to the original position.

Figure 24:
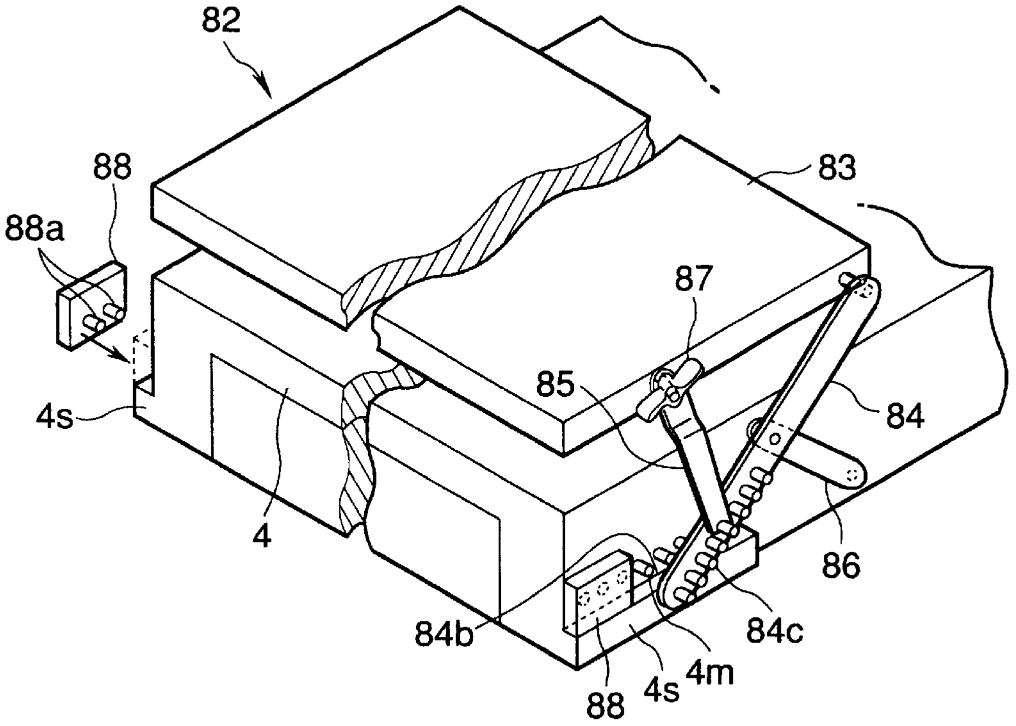
FIG. 24 is a perspective view of another modified support of the printer shown in FIG. 16, with parts cut away.
Figure 25:
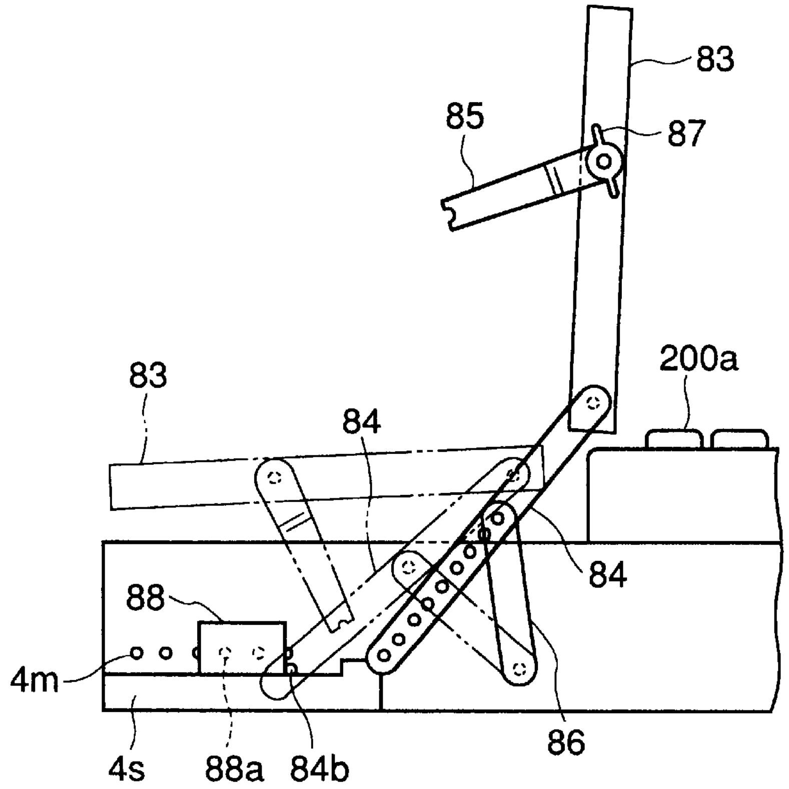
FIG. 25 is a side view showing the modified support of FIG. 24.

FIGS. 24 and 25 illustrate another modified structure of the third embodiment. FIG. 24 is a perspective view of another modified structure of the third embodiment with parts cut away. FIG. 25 is a side view of another modified structure of the third embodiment. The second modified structure shown in FIGS. 24 and 25 is different from the modified structure shown in FIGS. 22 and 23 in that it is provided with a stopper block 88.

As shown in FIGS. 24 and 25, the second modified structure has post supports 4*s* on the right and left sides of the frame section 4 of the paper-feed unit 2. Each post support 4*s* has a flat top surface. Above each post support 4*s*, multiple securing holes 4*m* are lined up horizontally at certain intervals on the side of the frame section 4. The stopper block 88 has securing posts 88*a* arranged at the same intervals as the securing holes 4*m* and is disposed on the top surface of the post support 4*s*, with the securing posts 88*a* fit in the securing holes 4*m*. The stopper block 88 can be placed at a desired position. The other part of the structure is the same as the modified structure shown in FIGS. 22 and 23.

The bed 83 of the modified structure shown in FIGS. 24 and 25 is operated as described here. When the stopper block 88 is selectively positioned and secured on the post support 4*s*, the securing post 84*b* of the first link 84 is stopped at the corner made by the vertical face of the stopper block 88 and the top surface of the post support 4*s*. The height of the bed 83 is accordingly set. When a floppy disk is inserted into or ejected from a disk slot of the notebook computer 200, the bed 83 is raised as shown in FIG. 25. Meanwhile, the securing post 84*b* of the first link 84 can be freely moved away from the corner (to the right in FIG. 25), raising the first link 84 and turning the bed 83 largely upward.

As described above, the modified structure shown in FIGS. 24 and 25 allows the bed 83 to be turned largely upward, making it very easy to insert and eject a floppy disk. Any depressed part or the like does not need to be formed on the bed 83.

Fourth Embodiment

A printer according to a fourth embodiment of the present invention will next be described.

Figure 26:
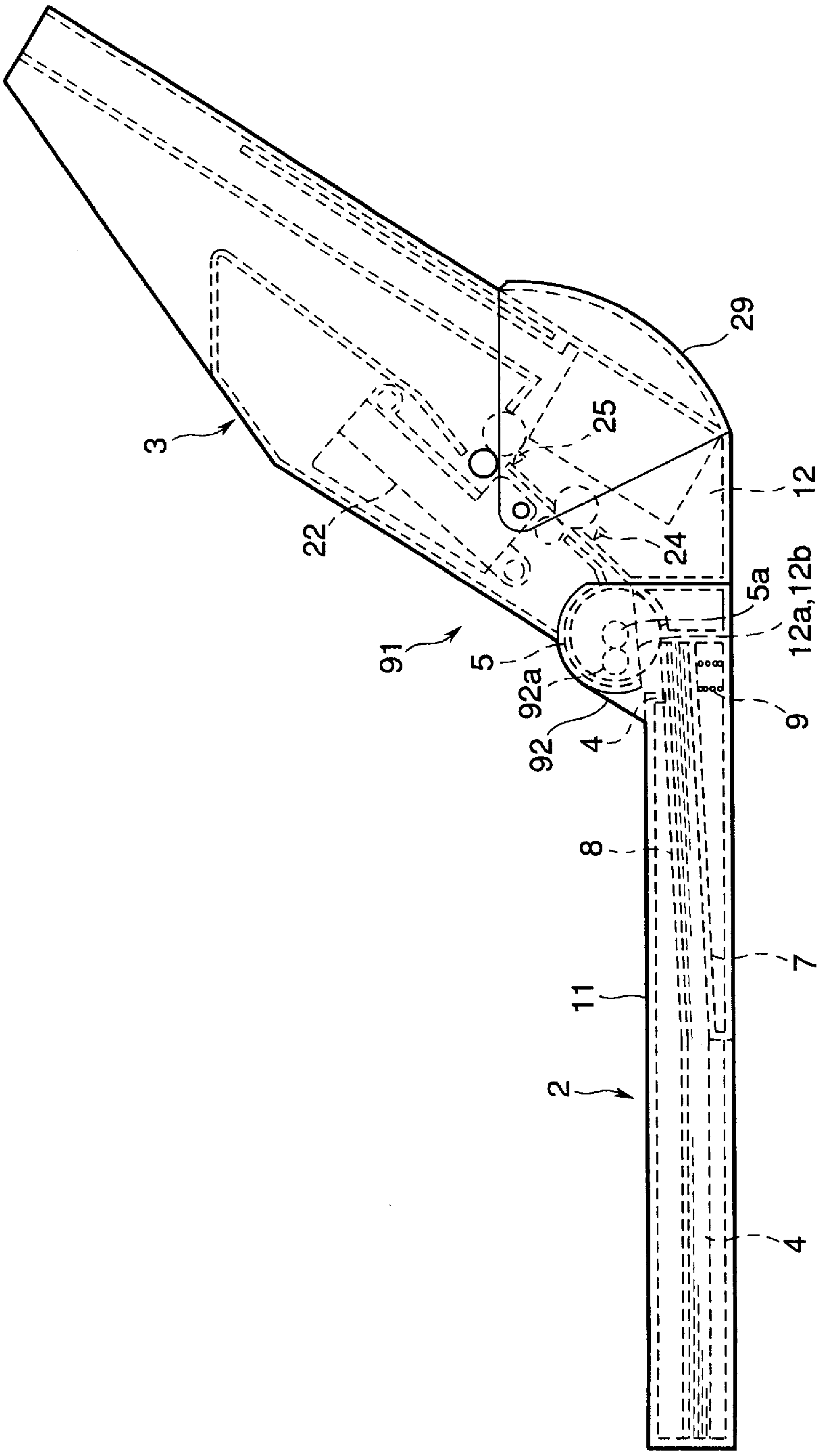
FIG. 26 is a side view of a printer according a fourth embodiment of the present invention.
Figure 27:
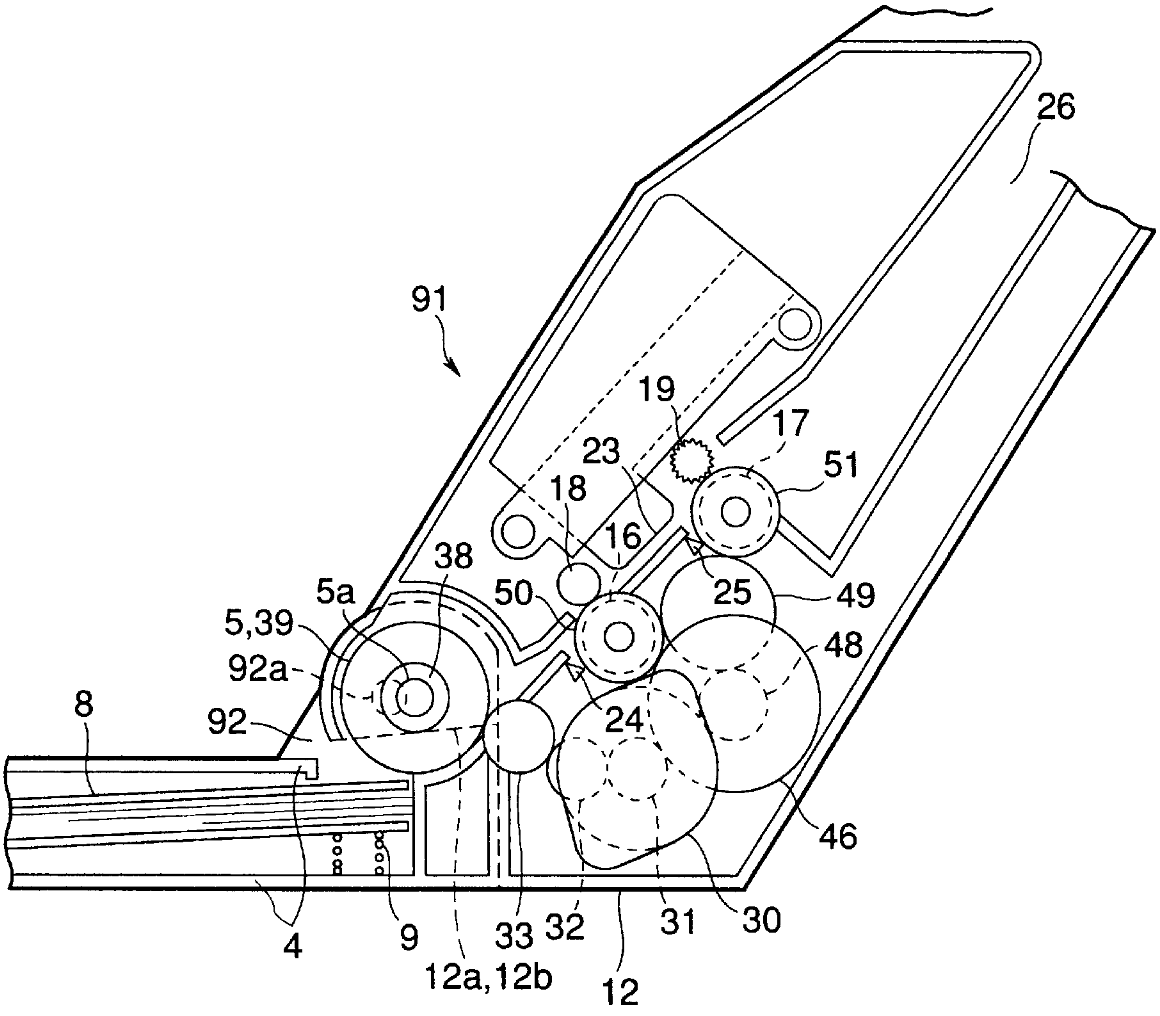
FIG. 27 is a side view showing the configuration of the power transmission system of the printer shown in FIG. 26.

FIG. 26 is a side view of the printer of the fourth embodiment, and FIG. 27 is a side view of the power transmission system of the fourth embodiment. In FIGS. 26 and 27, a printer 91 of the fourth embodiment has the paper-feed unit 2 and the print unit 3 in the same way as the first embodiment does. The frame section 4 of the paper-feed unit 2 has a raised section 92 along the deepest side (the side closest to the print unit 3). The raised section 92 is provided with a shaft 92*a* on its left and right sides. The side walls 12*a* and 12*b* of the frame section 12 are held by the raised section 92 from both sides and rotatably carried on the shaft 92*a*. The print unit 3 contains the paper-feed roller 5, of which the shaft 5*a* is rotatably supported on the side walls 12*a* and 12*b* of the frame section 12. The shaft 92*a* is placed upstream from the shaft 5*a* with respect to the travelling direction of the printing paper 8 (to the left of the shaft 5*a* in the figures). A certain distance is kept between the shaft 92*a* and the shaft 5*a*.

With reference to FIG. 27, the paper-feed power transmission system is described here. As shown in FIG. 27, the drive gear 31 of the feed motor 30 engages with the idle gear 32, which engages with the idle gear 33. This idle gear 33 engages with the first one-way gear 39. As in the first embodiment, the first one-way gear 39 is provided on the shaft 5*a*. Unlike the first embodiment, the printer 91 of the fourth embodiment does not have the power switching section 36. The shaft 5*a* carries just the first one-way gear 39, as described above. The transmission system to the resist roller 16 and the feed roller 17 and other configuration are the same as those in the first embodiment.

The printer 91 of the fourth embodiment operates as follows. When the feed motor 30 is driven for printing, the rotation is transmitted through the idle gears 32 and 33 and the first one-way gear 39 to the paper-feed roller 5, which supply the paper 8. The subsequent operation is the same as the operation of the first embodiment.

Figure 28:
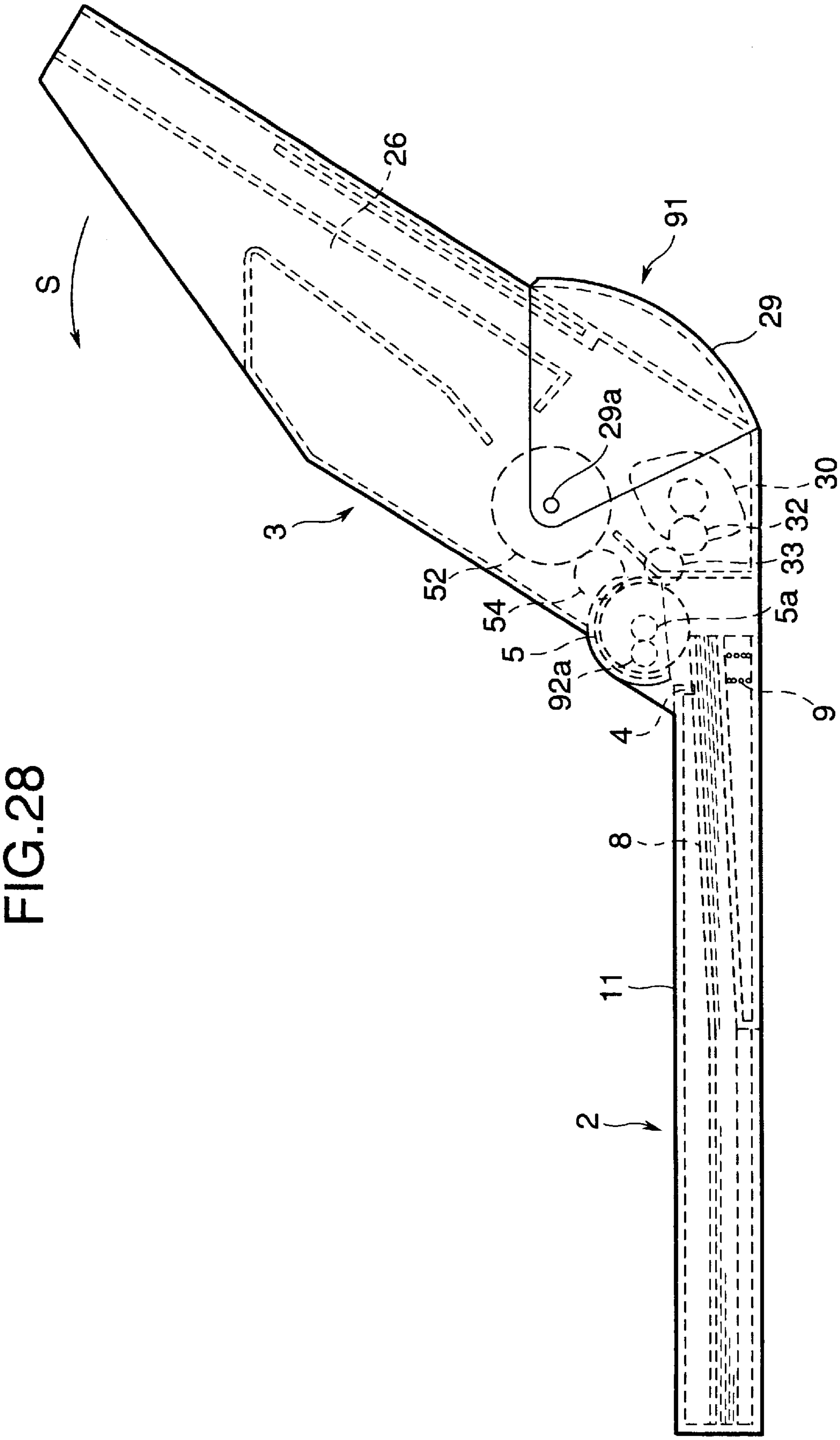
FIGS. 28 to 30 are side views showing how the printer indicated in FIG. 26 folds.
Figure 29:
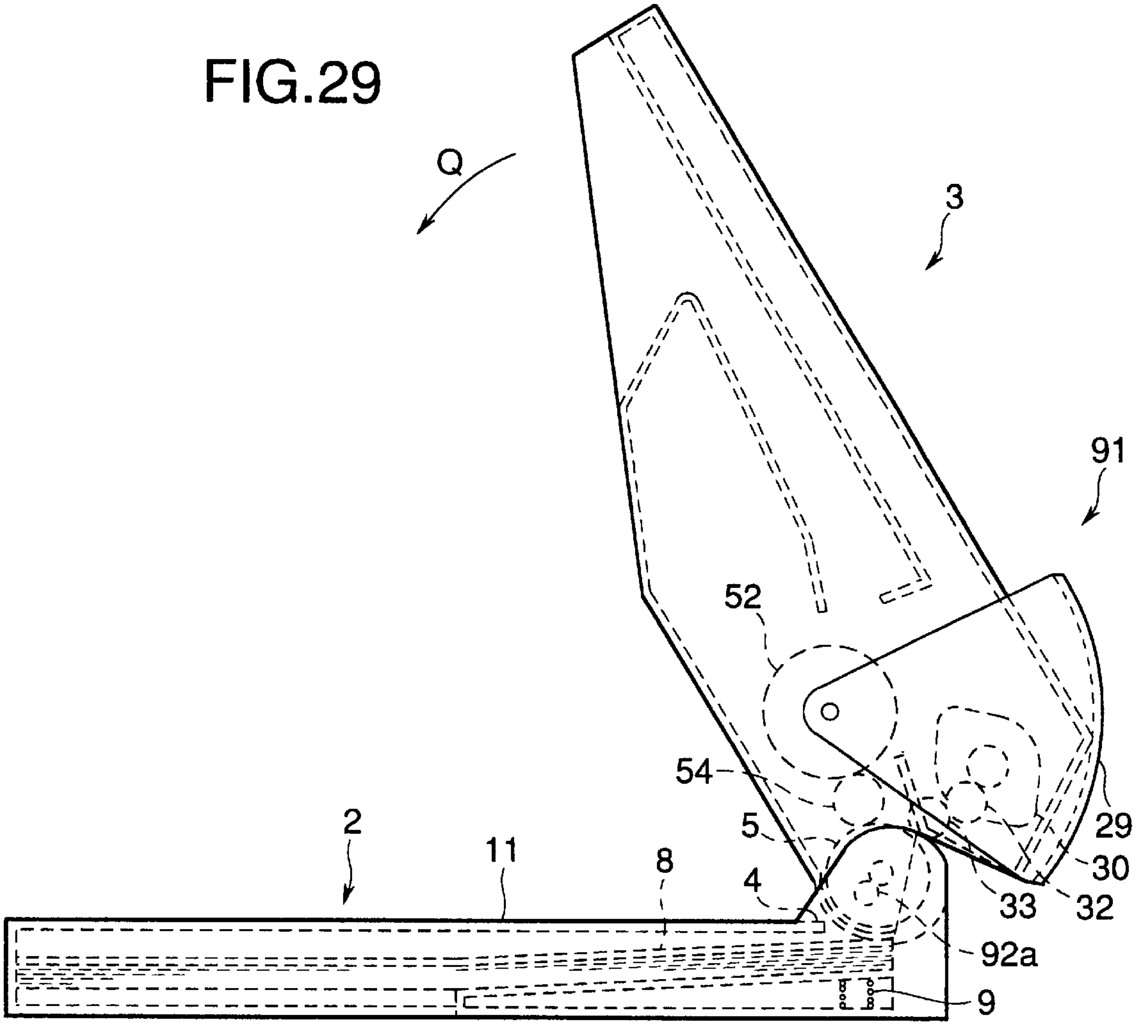
Figure 30:
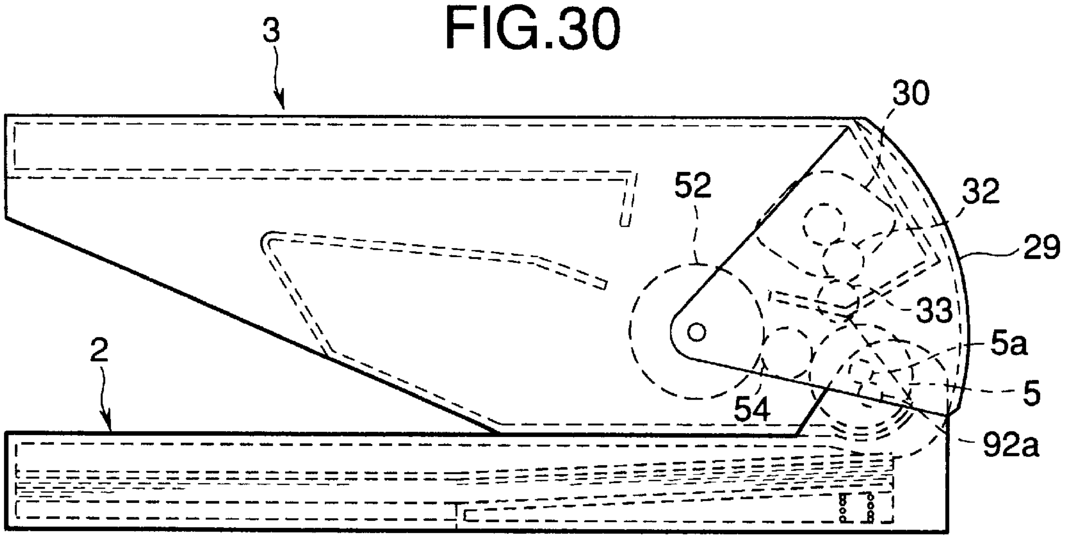

With reference to FIGS. 28, 29 and 30, the folding of the print unit 3 is described. FIGS. 28, 29 and 30 are side views illustrating how the print unit 3 of the fourth embodiment is folded. The print unit 3 in the unfolded state shown in FIG. 28 is pulled at the top and turned in the direction illustrated by the arrow S. The print unit 3 turns on the shaft 92*a*. Meanwhile, the paper-feed roller 5 is raised, as shown in FIG. 29. With this movement, the printing paper 8 is urged upward by the spring 9, and the paper 8 at the top is pressed against the frame section 4 above the paper cassette 6. When the print unit 3 is turned further downward, the paper-feed roller 5 is separated from the paper 8. In this state, the print unit 3 lies flat as shown in FIG. 30. The print unit 3 can be raised from this folded state by reversing the folding procedure described above. In the fourth embodiment, the rotary cover 29 operates in the same way as in the first embodiment.

As has been described above, when the print unit 3 of the fourth embodiment is folded, the paper-feed roller 5 can be separated from the paper 8 without the advance knob operation as in the first embodiment. Folding the print unit 3 does not disturb the papers 8 neatly stacked in the paper cassette 6. The power transmission system can be made up of a fewer number of components, and the configuration can be simplified.

Fifth Embodiment

A printer according to a fifth embodiment of the present invention will next be described.

Figure 31:
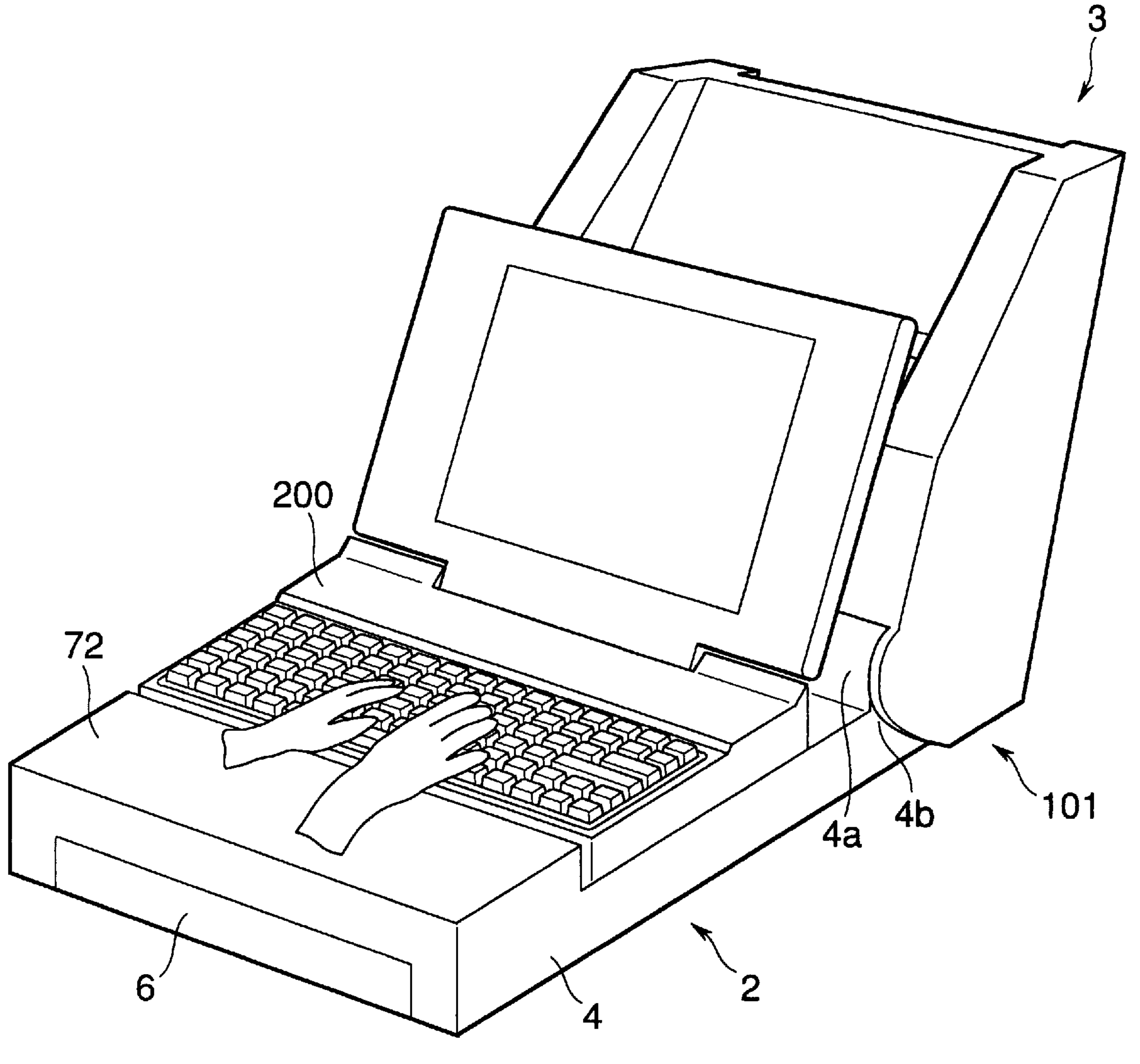
FIG. 31 is a perspective view showing a printer according to a fifth embodiment of the present invention.
Figure 32:
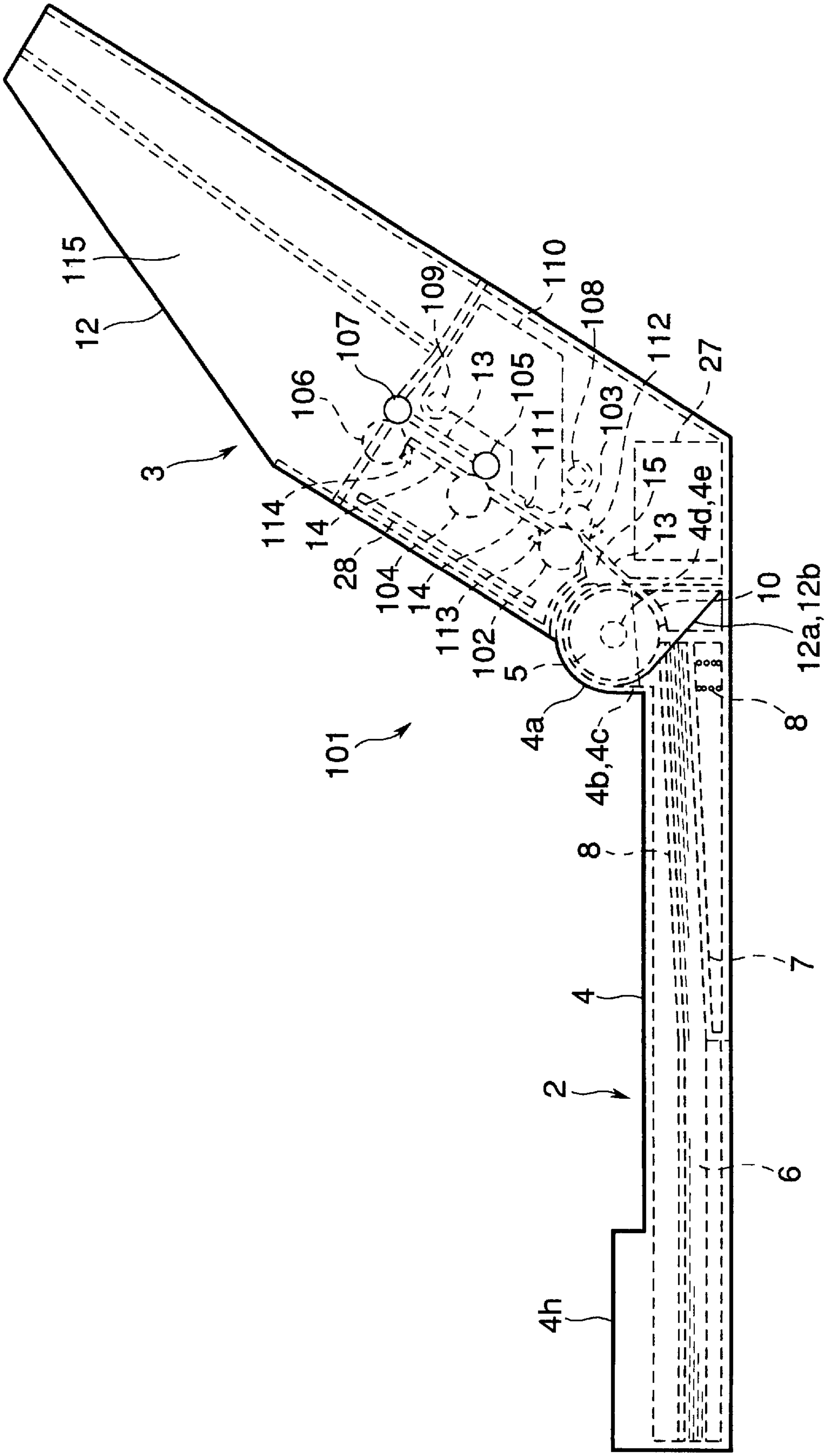
FIG. 32 is a side view of the printer shown in FIG. 31.

FIG. 31 is a perspective view of a printer 101 of the fifth embodiment. FIG. 32 is a side view of the printer of the fifth embodiment. The printer 101 of the fifth embodiment is the same as the printer of the second embodiment described above except for the internal structure of the print unit 3.

As shown in FIGS. 31 and 32, the print unit 3 of the printer 101 contains the lower paper guide 13 and the upper paper guide 14, which form the paper path 15 through which the printing paper 8 travels. Along the paper path 15, a pair of resist rollers 102 and 103, a first feed roller 104, a spur gear 105, a second feed roller 106, and a spur gear 107 are provided.

Two guide shafts 108 and 109 are disposed at right angles to the paper transport direction (in the direction of the width of the paper). The guide shafts 108 and 109 are provided with a carriage 110 that slides thereon. The carriage 110 incorporates an ink-jet print head 111.

A first paper detection sensor 112 and a second paper detection sensor 113 are placed upstream and downstream from the resist rollers 102 and 103 respectively. A third paper detection sensor 114 is placed upstream from the second feed roller 106. At the downstream end of the paper path 15, an output tray 115 is placed to hold printed papers 8. Referring to the figure, the reference numeral 27 denotes the power supply section, and the reference numeral 28 denotes the control printed circuit board. In the fifth embodiment, the positions of the carriage 110 and the control printed circuit board 28 in the first embodiment are inverted with respect to the paper path 15.

Figure 33:
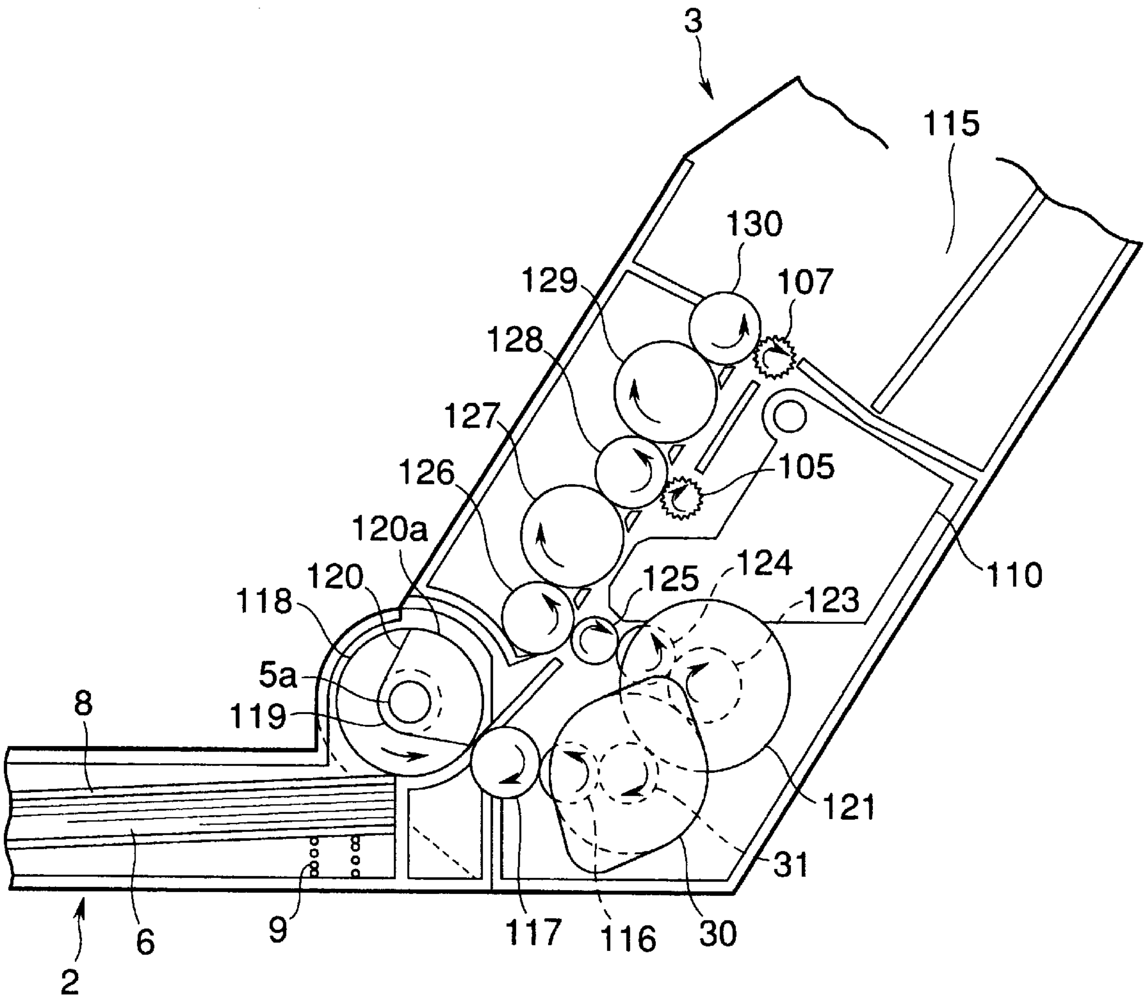
FIG. 33 is a side view of the power transmission system of the printer indicated in FIG. 31.
Figure 34:
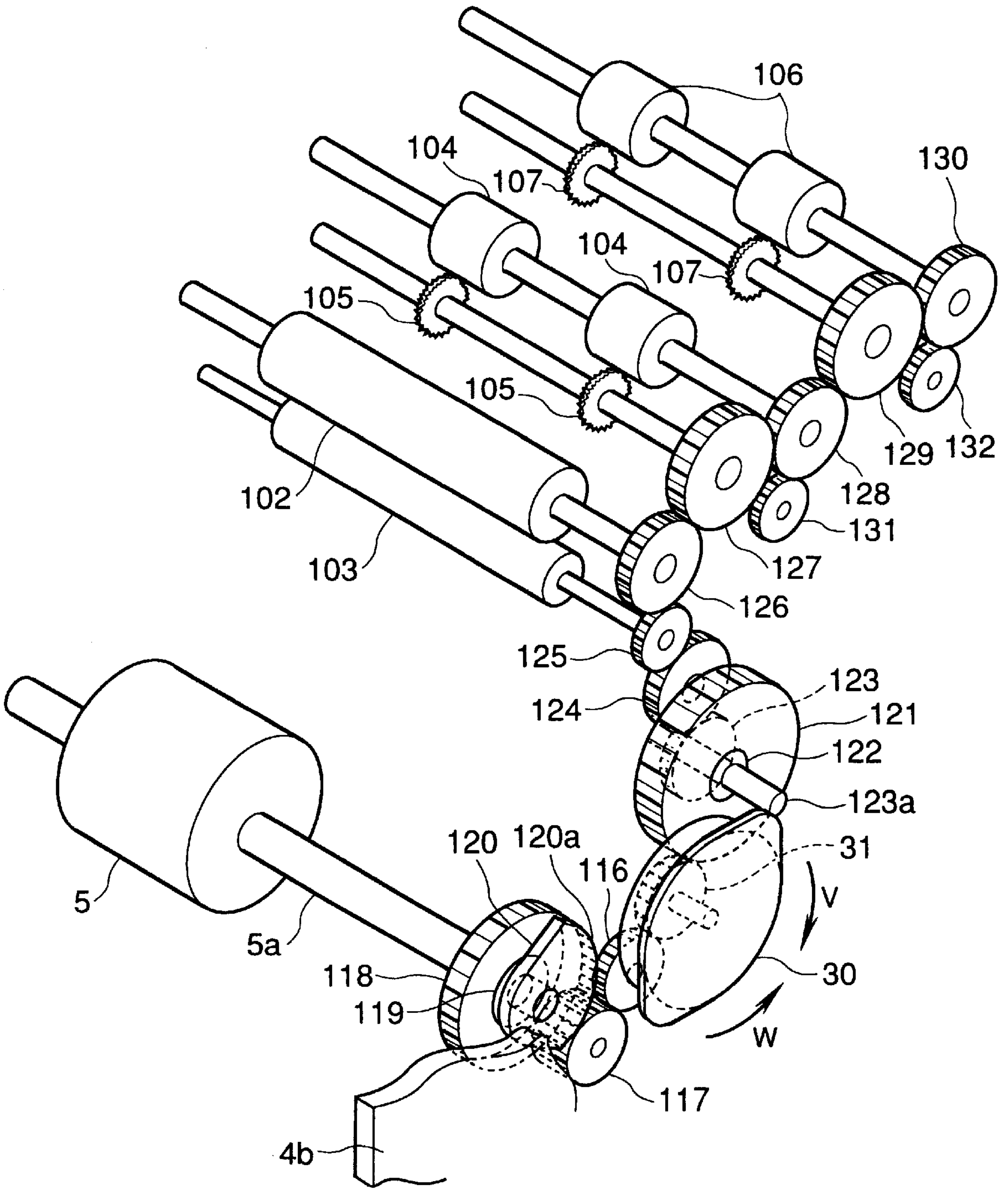
FIG. 34 is a perspective view of the power transmission system shown in FIG. 33.

The printer 101 of the fifth embodiment uses the paper-feed power transmission system as described below. FIG. 33 is a side view of the power transmission system in the fifth embodiment. FIG. 34 is a perspective view of the power transmission system in the fifth embodiment. Referring to the figures, the drive gear 31 of the feed motor 30 engages with idle gears 116 and 117. The idle gear 117 engages with a first one-way gear 118 incorporating a one-way bearing 119. The one-way bearing 119 locks the shaft 5*a* when a rotation is made in a counterclockwise direction illustrated in FIG. 33, and frees the shaft 5*a* when a clockwise rotation is made. On the inner surface of the side wall 4*b*, a fan-shaped gear 120 is secured. The fan-shaped gear 120 has a toothed section 120*a* which has almost the same diameter as the first one-way gear 118 which turns on the center of rotation of the shaft 5*a* of the paper-feed rollers. When the printer 101 is in the position indicated in FIG. 33, the idle gear 117 engages with the first one-way gear 118 and does not engage with the toothed section 120*a* of the fan-shaped gear 120.

The drive gear 31 of the feed motor 30 also engages with a second one-way gear 121. The second one-way gear 121 incorporates a one-way bearing 122, which locks the shaft 123*a* when a clockwise rotation is made and frees the shaft 123*a* when a counterclockwise rotation is made. An idle gear 123 provided on the same shaft 123*a* as the second one-way gear 121 engages with an idle gear 124, the idle gear 124 engages with a resist roller gear 125, and the resist roller gear 125 engages with another resist roller gear 126. The resist roller gear 126 engages with an idle gear 127, the idle gear 127 with a feed roller gear 128, the feed roller gear 128 with an idle gear 129, and the idle gear 129 with a feed roller gear 130. The feed roller gear 128 also engages with a spur gear 131. The feed roller gear 130 also engages with another spur gear 132.

Figure 35:
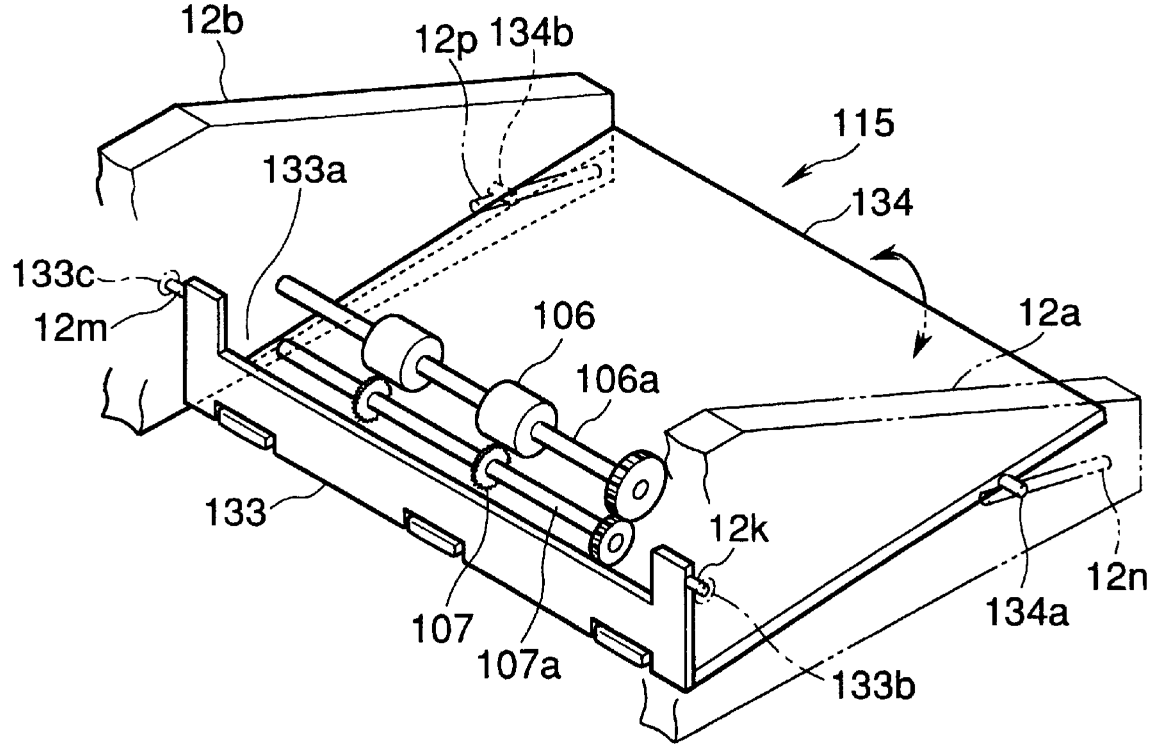
FIG. 35 is a perspective view of the output tray (stacker) of the printer shown in FIG. 31.

The description of the output tray 115 of the fifth embodiment follows. FIG. 35 is a perspective view of the output tray 115 of the fifth embodiment. As shown in the drawing, the output tray 115 has an end plate 133 and a paper table 134. The end plate 133 has a depressed area 133*a* at its top and also has supporting posts 133*b* and 133*c* integrally formed at the upper ends of the left and right sides so as to project outward. In the depressed area 133*a*, the second feed roller 106 and the spur gear 107 are disposed in parallel with the direction of the length of the end plate 133. The supporting posts 133*b* and 133*c* are rotatably fit in the shaft supporting holes 12*k* and 12*m* which are formed on the side walls 12*a* and 12*b* so that the posts are set at almost the same level as the outlet where the paper is sent out by the second feed roller 106 and the spur gear 107. The depth of the depressed area 133*a* measured from the position of the supporting posts 133*b* and 133*c* is greater than the diameter of the second feed roller 106. The shaft 106*a* of the second feed roller 106 and a spur gear shaft 107*a* are supported by the guide frame, which is not shown in the figures.

The paper table 134 is joined at one side onto an end plate 133 so as to be turned on the joint like a hinged member, and has guide pins 134*a* and 134*b* integrally formed at both ends on the other side. Long grooves 12*n* and 12*p* are formed on the side walls 12*a* and 12*b* of the frame section 12. The guide pins 134*a* and 134*b* are fit in the long grooves 12*n* and 12*p* respectively so as to be slid therein.

Figure 36:
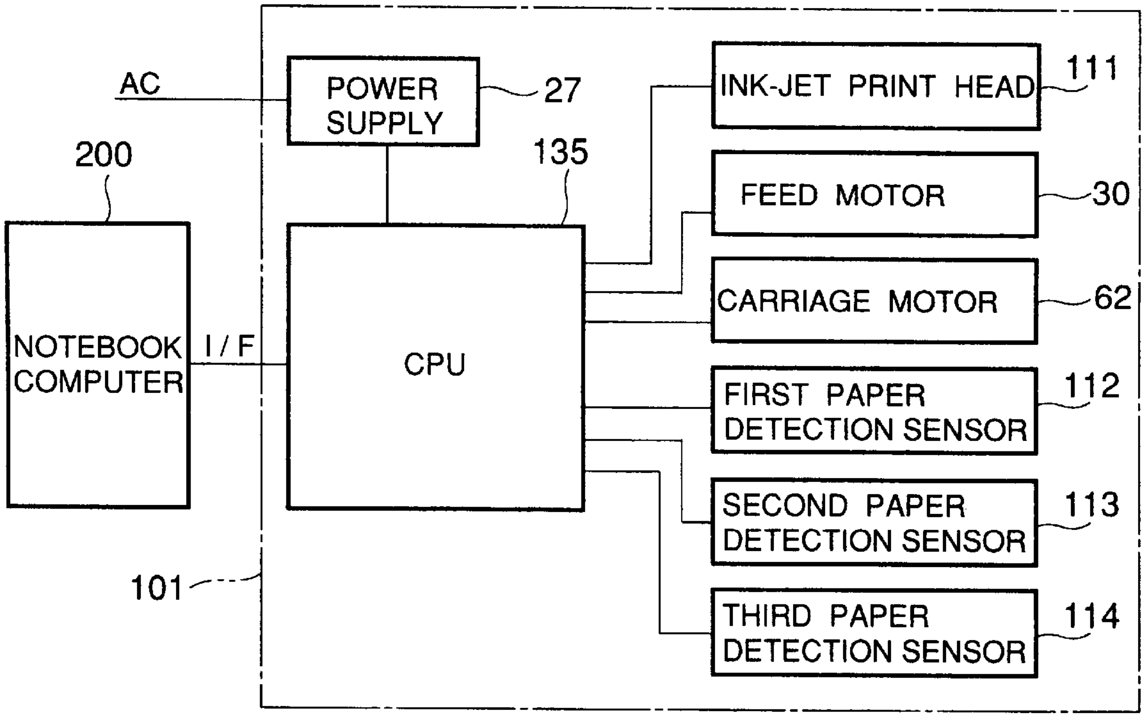
FIG. 36 is a block diagram showing the configuration of the control system of the printer indicating in FIG. 31.

FIG. 36 is a block diagram showing the configuration of the control system of the printer 101 according to the fifth embodiment. In the figure, the control unit (CPU) 135 controls the whole operation of the printer 101. This block diagram is different from the block diagram shown in FIG. 11 in that the third paper detection sensor 114 is provided.

The printer 101 of the fifth embodiment is operated as follows. The print operation is described first. The notebook computer 200 is placed on the table 11 of the paper-feed unit 2 and electrically connected to the printer 101, then the notebook computer 200 and the printer 101 are turned on. When the feed motor 30 is first rotated in a clockwise direction illustrated in FIG. 33, the first one-way gear 118 rotates counterclockwise. Meanwhile, the idle gear 117 and fan-shaped gear 120 are not engaged. When the first one-way gear 118 rotates counterclockwise, the rotation is transmitted to the paper-feed roller 5, causing the paper 8 to be supplied. While the feed motor 30 is rotating clockwise, the second one-way gear 121 idles, and the idle gear 123 and other downstream gears do not rotate.

When the paper 8 is supplied from the paper cassette 6 into the paper path 15, the first paper detection sensor 112 detects the front end of the paper 8. After a lapse of a certain time, the feed motor 30 stops, stopping the paper 8 with its front end touching the contact position between the resist rollers 102 and 103.

The feed motor 30 is next rotated counterclockwise. This causes the second one-way gear 121 to rotate clockwise. The rotation is transmitted to the resist rollers 102 and 103, the first feed roller 104, the spur gear 105, the second feed roller 106, and the spur gear 107. Meanwhile, the first one-way gear 118 idles, and the paper-feed roller 5 does not rotate. When the paper 8 is fed by the resist rollers 102 and 103, however, the frictional force of the paper 8 rotates the paper-feed roller 5, causing the shaft 5*a* of the paper-feed roller and the first one-way gear 118 to idle.

The front end of the paper 8 fed by the rotation of the resist rollers 102 and 103 is detected by the second paper detection sensor 113. From this detection time, the paper 8 is fed a discrete number of lines. The carriage 110 incorporating the ink-jet print head 111 is moved to print on the paper 8. The first feed roller 104 and spur gear 105 and the second feed roller 106 and spur gear 107 deliver the printed paper 8 out into the output tray 115. The third paper detection sensor 114 detects the back end of the paper 8 to check whether the paper 8 is ejected into the output tray 115. The paper 8 is ejected with the printed face down. When multiple papers 8 are printed, the printed papers are stacked in such an order that the paper printed first can be seen first.

Figure 37:
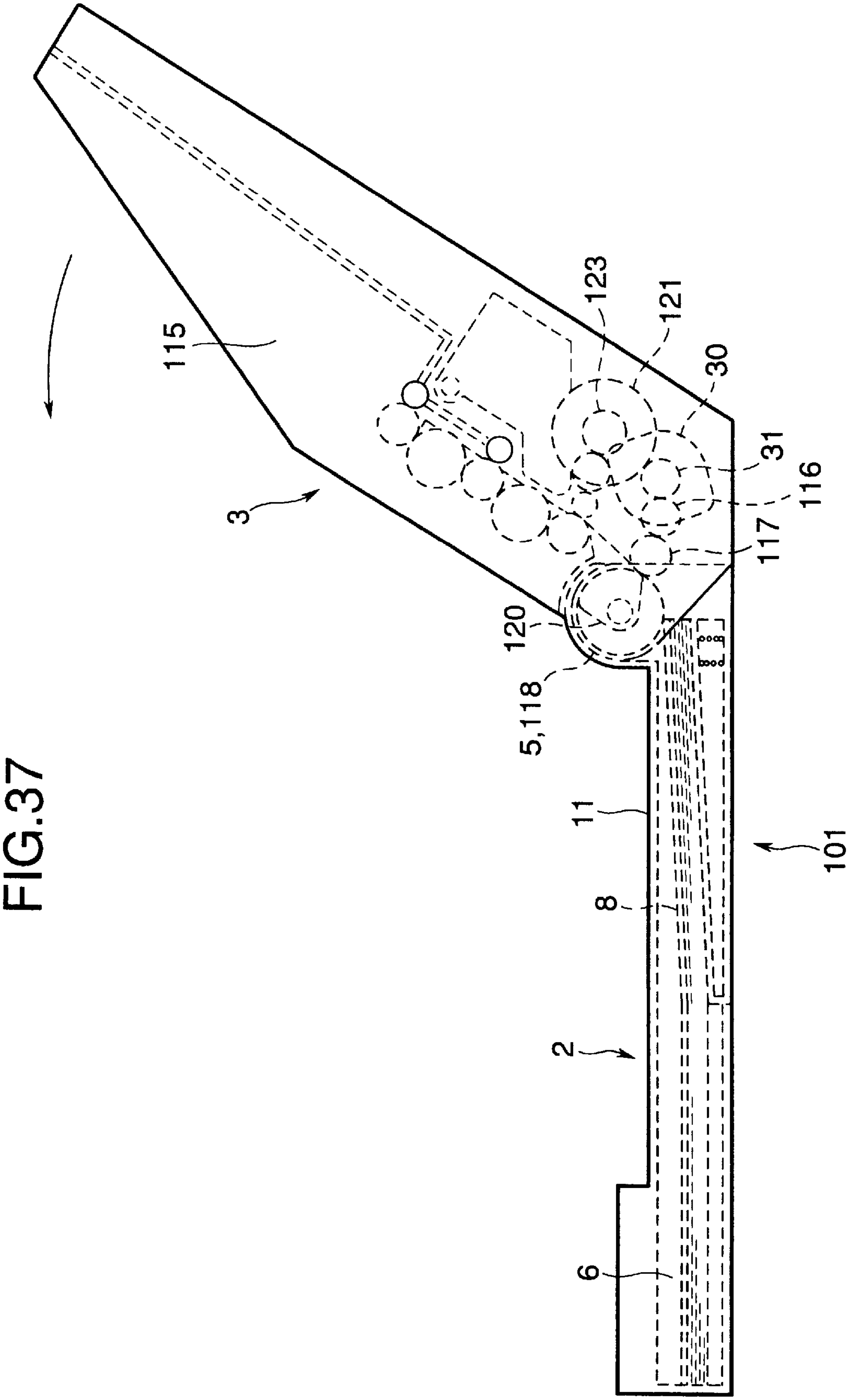
FIGS. 37 and 38 are a side view and a perspective view showing how the printer indicated in FIG. 31 folds.
Figure 38:
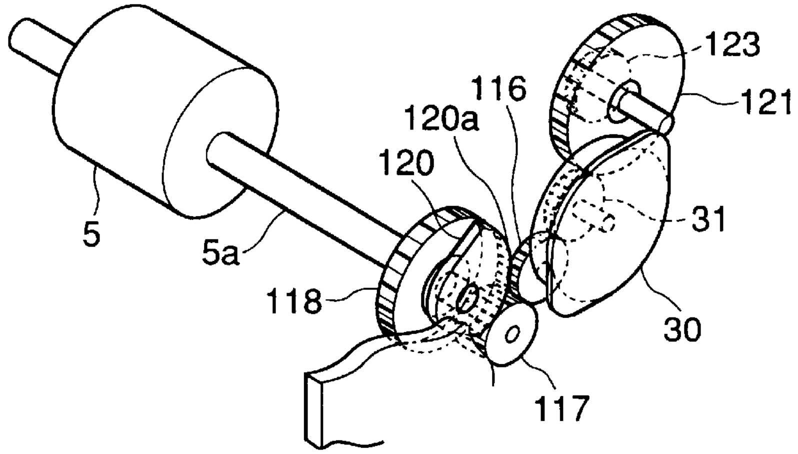
Figure 39:
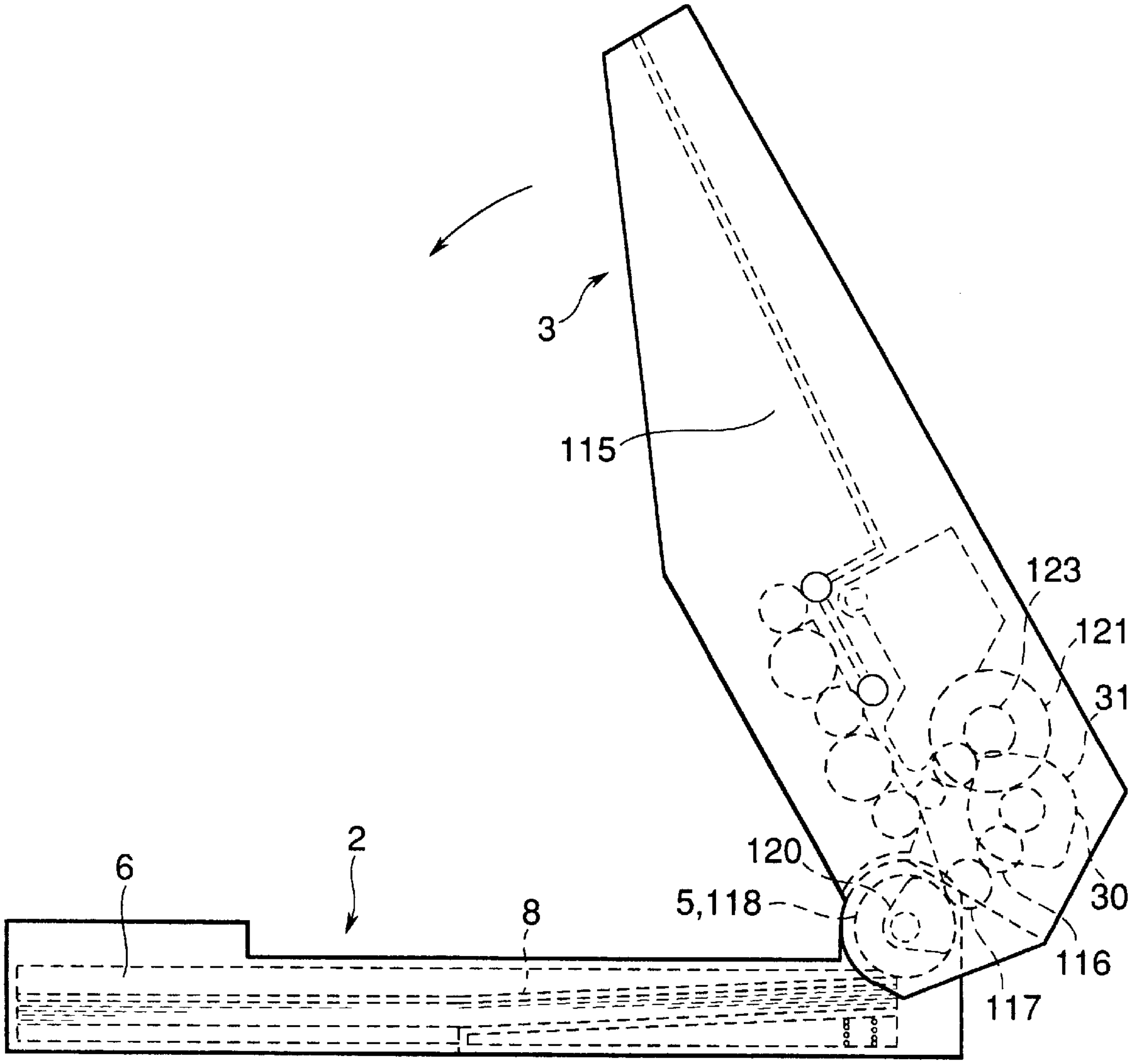
FIGS. 39 and 40 are another side view and another perspective view showing how the printer indicated in FIG. 31 folds.
Figure 40:
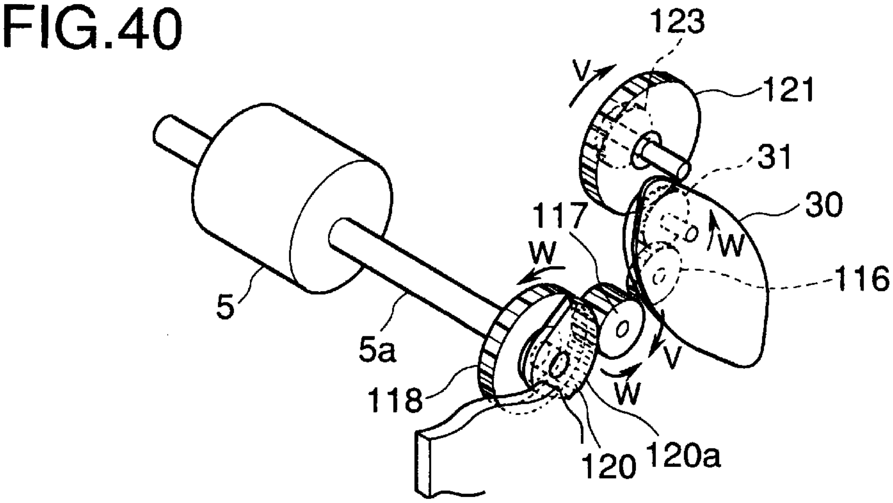
Figure 41:
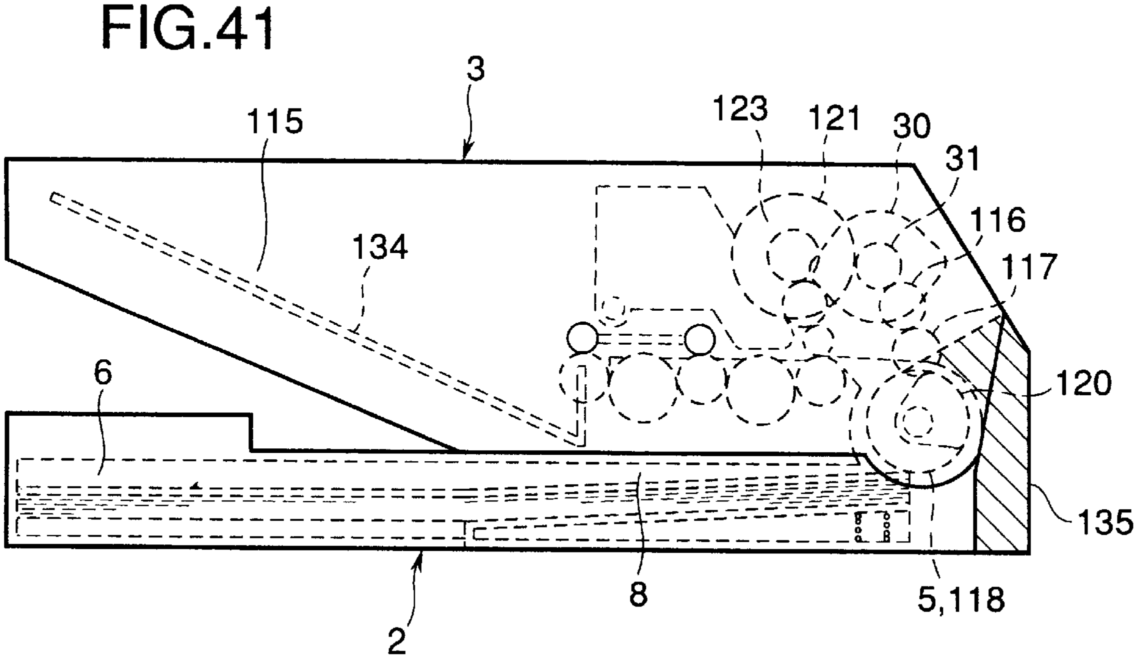
FIGS. 41 and 42 are a further side view and a further perspective view showing how the printer indicated in FIG. 31 folds.
Figure 42:
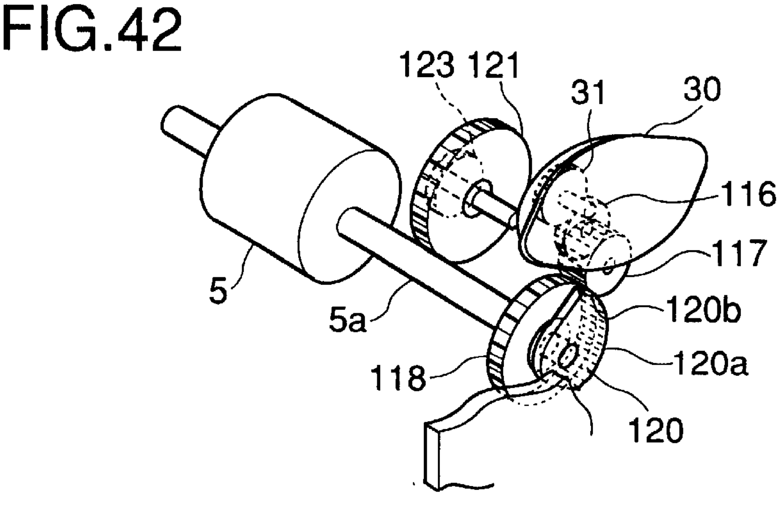

The folding of the print unit 3 of the fifth embodiment is described with reference to the following figures. FIGS. 37, 39 and 41 are side views showing the folding of the fifth embodiment. FIGS. 38, 40 and 42 are perspective views showing the operation of the power transmission system of the fifth embodiment.

The notebook computer 200 is first removed from the table 11 of the paper-feed unit 2. FIG. 37 shows the state after the notebook computer 200 is removed. In this unfolded state, the idle gear 117 engages with the first one-way gear 118, but does not engage with the toothed section 120*a* of the fan-shaped gear 120, as shown in FIG. 38. When drawn from this position in the direction as illustrated by the arrow in FIG. 37, the print unit 3 turns on the shaft 5*a* of the paper-feed roller 5.

When the print unit 3 starts turning, the idle gear 117 as a planetary gear revolves around the first one-way gear 118 as a sun gear. Then, the idle gear 117 engages with the toothed section 120*a* of the fan-shaped gear 120. When the print unit 3 is further turned to the position indicated in FIG. 39, the idle gear 117 meshes with the toothed section 120*a* and the first one-way gear 118 and revolves around the fan-shaped gear 120. While the idle gear 117 is revolving around the toothed section 120*a* and first one-way gear 118 as a planet revolves around its sun, the load produced by the feed motor 30 and the like becomes a force to rotate the first one-way gear 118 in the direction as illustrated by the arrow W in FIG. 40. However, since the fan-shaped gear 120 is secured, the idle gear 117 is rotated counterclockwise (in the direction as illustrated by the arrow W) instead.

The rotation of the idle gear 117 on its axis is transmitted via the idle gears 116 to the drive gear 31 to rotate the second one-way gear 121 clockwise (in the direction as illustrated by the arrow V). With the rotation of the second one-way gear 121, the downstream gears of the paper-feed system also rotate. Meanwhile, the first one-way gear 118 is held in the stop state, and the paper-feed roller 5 does not rotate. Accordingly, the paper 8 held in the paper cassette 6 is not supplied.

The print unit 3 can be turned from the position indicated in FIG. 39 down to the folded position indicated in FIG. 41. During this movement, the gears of the paper-feed system rotate as described above, applying a load to the print unit 3 being turned. The load prevents any abrupt movement of the print unit 3, reducing the danger that the operator catches his or her hand in the folded printer, for instance.

When the print unit 3 is folded flat as shown in FIG. 41, the idle gear 117 is disengaged from the toothed section 120*a* of the fan-shaped gear 120 and stays within a depressed area 120*b* without touching, as shown in FIG. 42. In this position, the idle gear 117 is in contact with the first one-way gear 118 only. When the printer is folded in two, a guide cover 135 indicated in FIG. 41 is attached on the back (to the right in the figure) of the paper-feed roller 5.

The print unit 3 can be raised by reversing the procedure described above. When the print unit 3 is raised, the idle gear 117 engages with the toothed section 120*a* of the fan-shaped gear 120 and revolves around the fan-shaped gear 120 and first one-way gear 118, rotating in the direction as illustrated by the arrow V in FIG. 40. The rotation of the idle gear 117 is not transmitted to any gears downstream from the idle gear 123. Consequently, the rotation load of the paper-feed system is not applied to the print unit 3, allowing the print unit 3 to be opened relatively easily.

Figure 43:
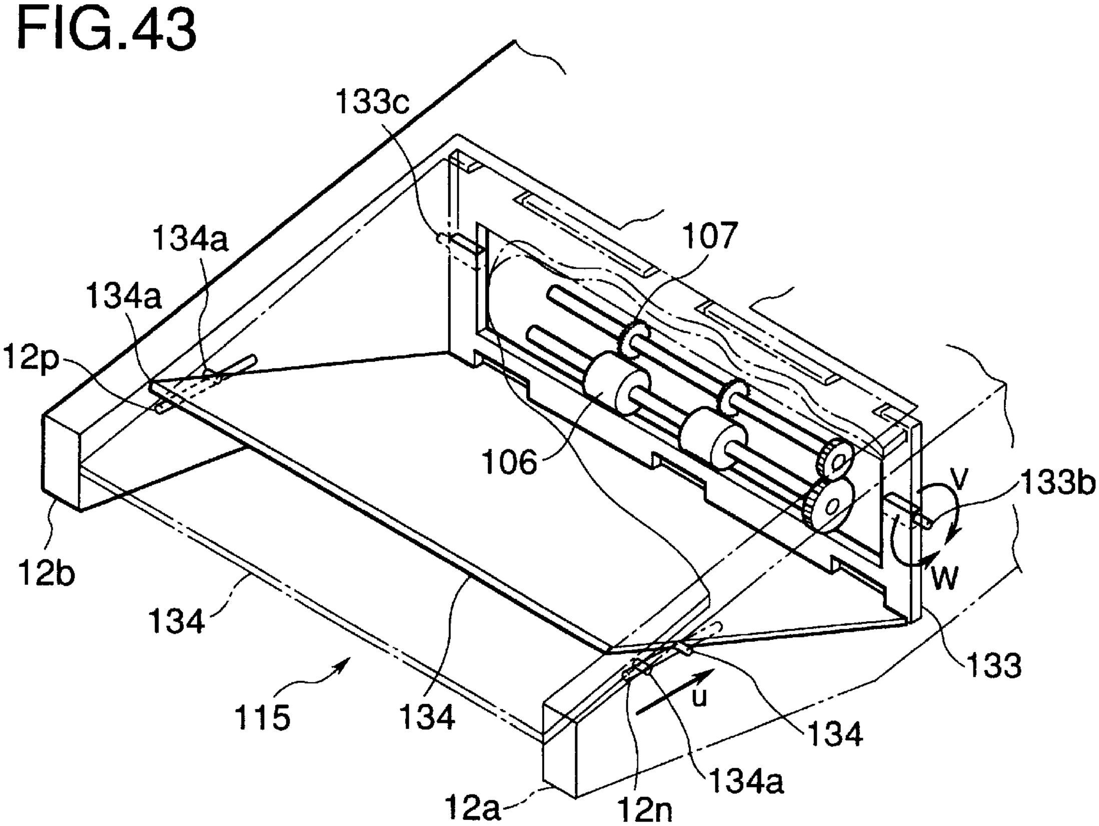
FIG. 43 is a perspective view showing the operation of the output tray of the printer indicated in FIG. 31.

The printer of the fifth embodiment can print even when the print unit 3 is in a folded state. The print operation of the fifth embodiment with the print unit 3 folded is described below. The first description is about the operation of the output tray while the print unit 3 is folded. FIG. 43 is a perspective view showing the operation of the output tray in the fifth embodiment.

When the print unit 3 is folded, the output tray 115 is in the position illustrated by the chain line in FIG. 43. In this state, the end plate 133 is turned on the supporting posts 133*b* and 133*c* almost 180 degrees in the direction illustrated by the arrow W. The guide pins 134*a* and 134*b* of the paper table 134 slide within the grooves 12*n* and 12*p* formed on the side walls 12*a* and 12*b*, in the direction illustrated by the arrow U. This moves the paper table 134 to the position illustrated by the solid line. While the print unit 3 is in its folded state, the guide cover 135 provided as described above guides the paper 8 supplied by the paper-feed roller 5. In this position, the print operation is carried out.

When the print operation is executed with the print unit 3 folded flat as shown in FIG. 41, the notebook computer 200 is not placed on the paper-feed unit 2. When the print operation starts with the notebook computer 200 connected to the printer 101, the feed motor 30 rotates the idle gear 117, which rotates the first one-way gear 118, rotating the paper-feed roller 5 counterclockwise. The paper feed roller 5 delivers the paper 8 from the paper cassette 6 to the guide cover 135, then into the paper path 15.

After a lapse of a certain time from when the paper 8 is detected by the first paper detection sensor, the feed motor

30 is rotated in the opposite direction to rotate the gears of the paper-feed system. The paper feed system sends the paper 8 along the paper path 15 for printing. When the printing is completed, the printed paper 8 is ejected into the output tray 115 by the second feed roller 106 and spur gear 107. Since the paper table 134 of the output tray 115 is disposed as shown in FIG. 43, the paper 8 is neatly placed on the paper table 134. With the print unit 3 folded and the paper table 134 moved with a single motion, as has been described above, the printer 101 can easily print in its folded state.

As has been described above, the fifth embodiment provides the printer 101 that can print in its folded state. The printer 101 has a small space even during printing and is easy to use.

Figure 44:
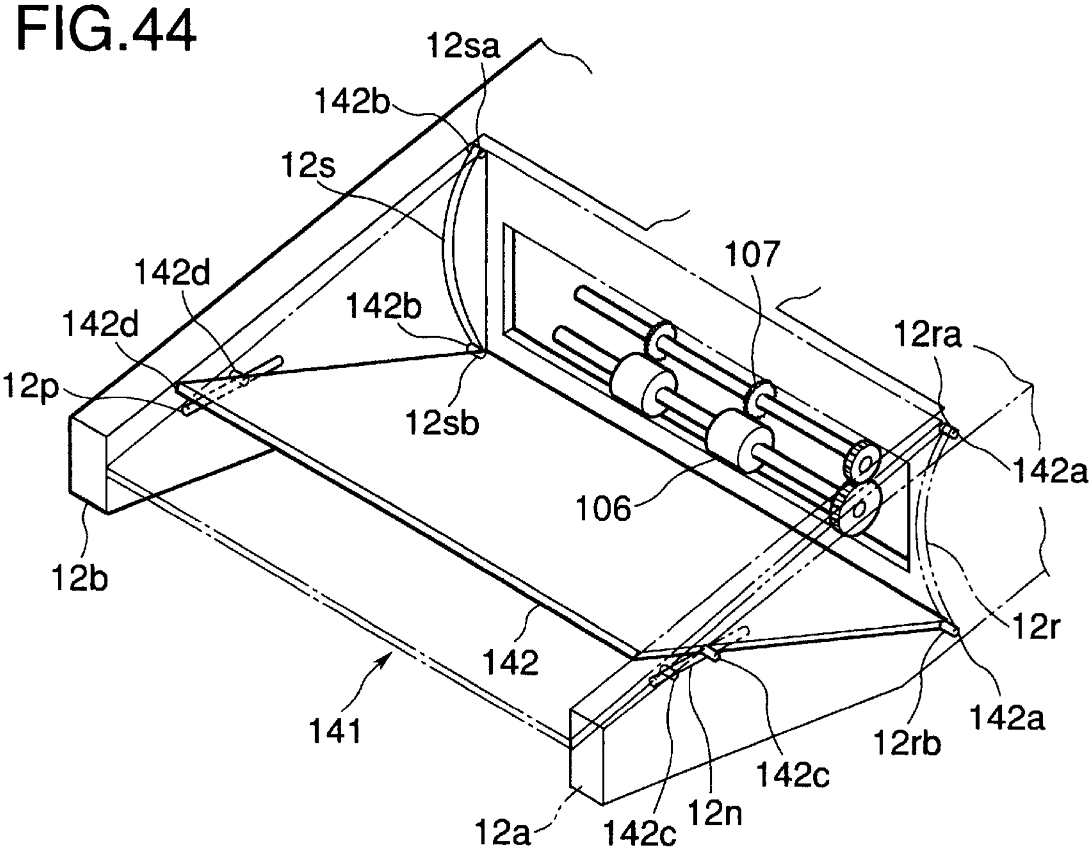
FIG. 44 is a perspective view of part of a printer modified with respect to the fifth embodiment.

The fifth embodiment may be modified as described here. FIG. 44 is a perspective view showing the structure modified with respect to the fifth embodiment, which is different from the fifth embodiment described above in the structure of the output tray.

As shown in FIG. 44, the modified output tray 141 has a paper table 142, which is provided with posts 142*a* and 142*b* integrally formed at both ends of the paper outlet side and with guide pins 142*c* and 142*d* integrally formed at both ends of the opposite side. A curved guiding groove 12*r* and the groove 12*n* are formed on the side wall 12*a* of the print unit 3, and a curved guiding groove 12*s* and the groove 12*p* are formed on the opposite side wall 12*b*. The posts 142*a* and 142*b* are fit in the guiding grooves 12*r* and 12*s* respectively so as to be slid therein. The guide pins 142*c* and 142*d* are fit in the grooves 12*n* and 12*p* so as to be slid therein. The guiding grooves 12*r* and 12*s* are formed symmetrically about the paper outlet including the second feed roller 106 and the spur gear 107. The ends 12*ra* and 12*rb* of the guiding groove 12*r* and the ends 12*sa* and 12*sb* of the guiding groove 12*s* are in the same plane as the paper outlet. The other configuration is the same as the configuration of the fifth embodiment described above.

In the modified structure, the paper table 142 is set in the position illustrated by the double-dashed chain line when the print unit 3 is raised. When the print unit 3 is folded, the paper table 142 is set in the position illustrated by the solid line. With the paper table 142 set as described above, the printed paper 8 is ejected onto the paper table 142. The paper table 142 can be moved with a manual single motion as in the fifth embodiment described above. This modified structure has the same effect as the fifth embodiment, as has been described above, and also enables the output tray to be made by a fewer number of members.

Figure 45:
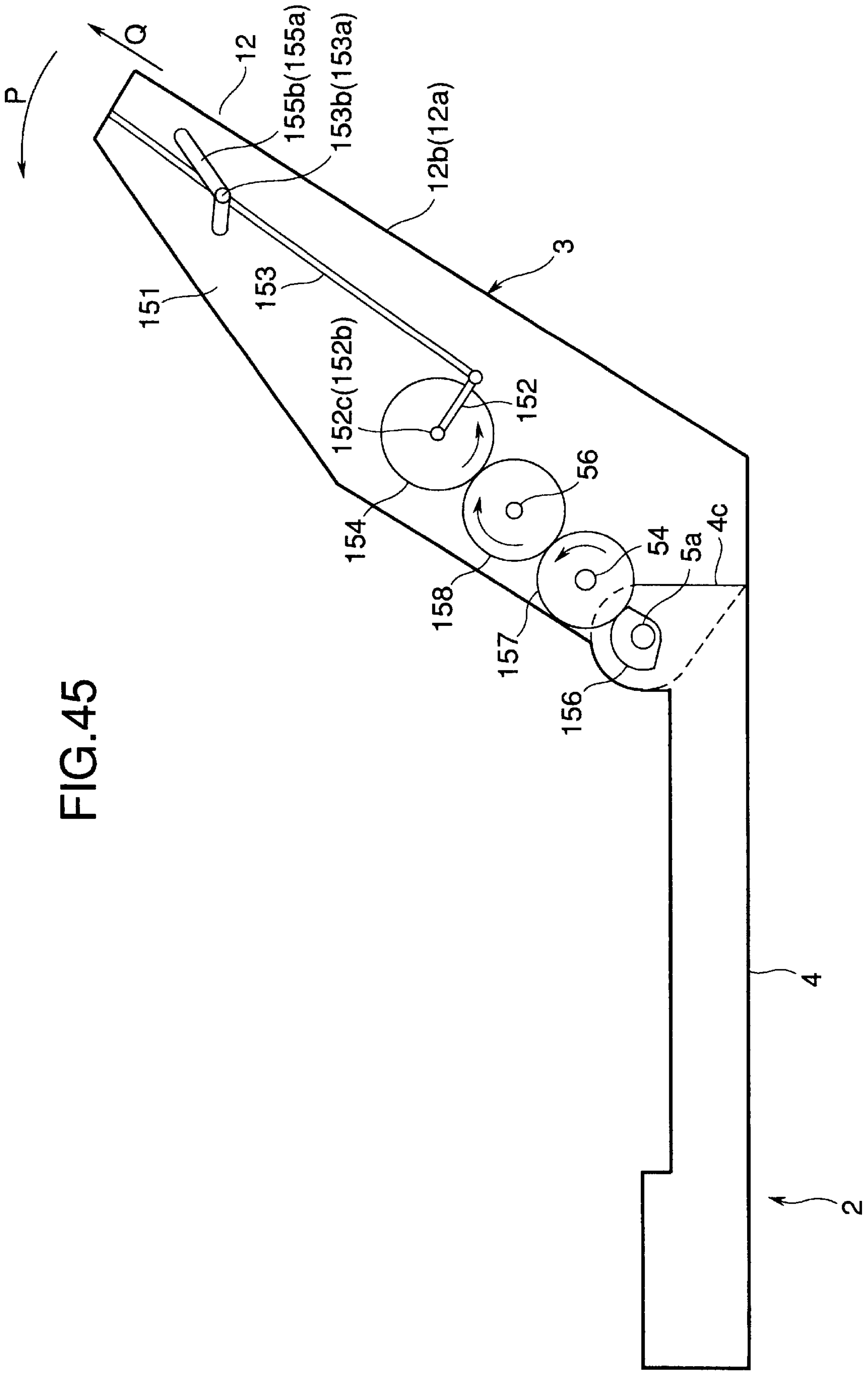
FIG. 45 is a perspective view of another modified printer with respect to the fifth embodiment.

The fifth embodiment may also be modified as described below. FIG. 45 is a side view showing another structure modified with respect to the fifth embodiment. In this modified structure, the output tray is reoriented for the operator's convenience as the print unit 3 is raised or folded. As shown in FIG. 45, the output tray has an end plate 152 and a paper table 153. The end plate 152 has supporting posts 152*b* and 152*c* integrally formed at both ends of one side. The outer ends of the supporting posts 152*b* and 152*c* are rotatably fit in the shaft supporting holes formed on the side walls 12*a* and 12*b* of the print unit 3. The inner end of the supporting post 152*c* (not shown in the figure) is provided with a driven gear 154 fixed on it. The end plate 152 is joined at the other side onto one side of the paper table 153 so as to be turned on the joint like a hinged member, as in the fifth embodiment shown in FIG. 35. The paper table 153 has guide pins 153*a* and 153*b* integrally formed at both ends of the other side. The guide pins 153*a* and 153*b* are fit in doglegged guiding grooves 155*a* and 155*b* formed on the side walls 12*a* and 12*b* so as to be slid therein.

On the inner surface of the left side wall 4*c* of the frame section 4 of the paper-feed unit 2, a fan-shaped gear 156 that rotates on the center of rotation of the paper-feed roller 5, which is the center of rotation for raising and folding the print unit 3, is provided. The fan-shaped gear 156 engages with a first idle gear 157, which engages with a second idle gear 158. The first idle gear 157 and the second idle gear 158 are rotatably fit on rotary shafts 159 and 160 formed on the side wall 12*b* respectively. The second idle gear 158 also engages with the driven gear 154 mentioned above.

Figure 46:
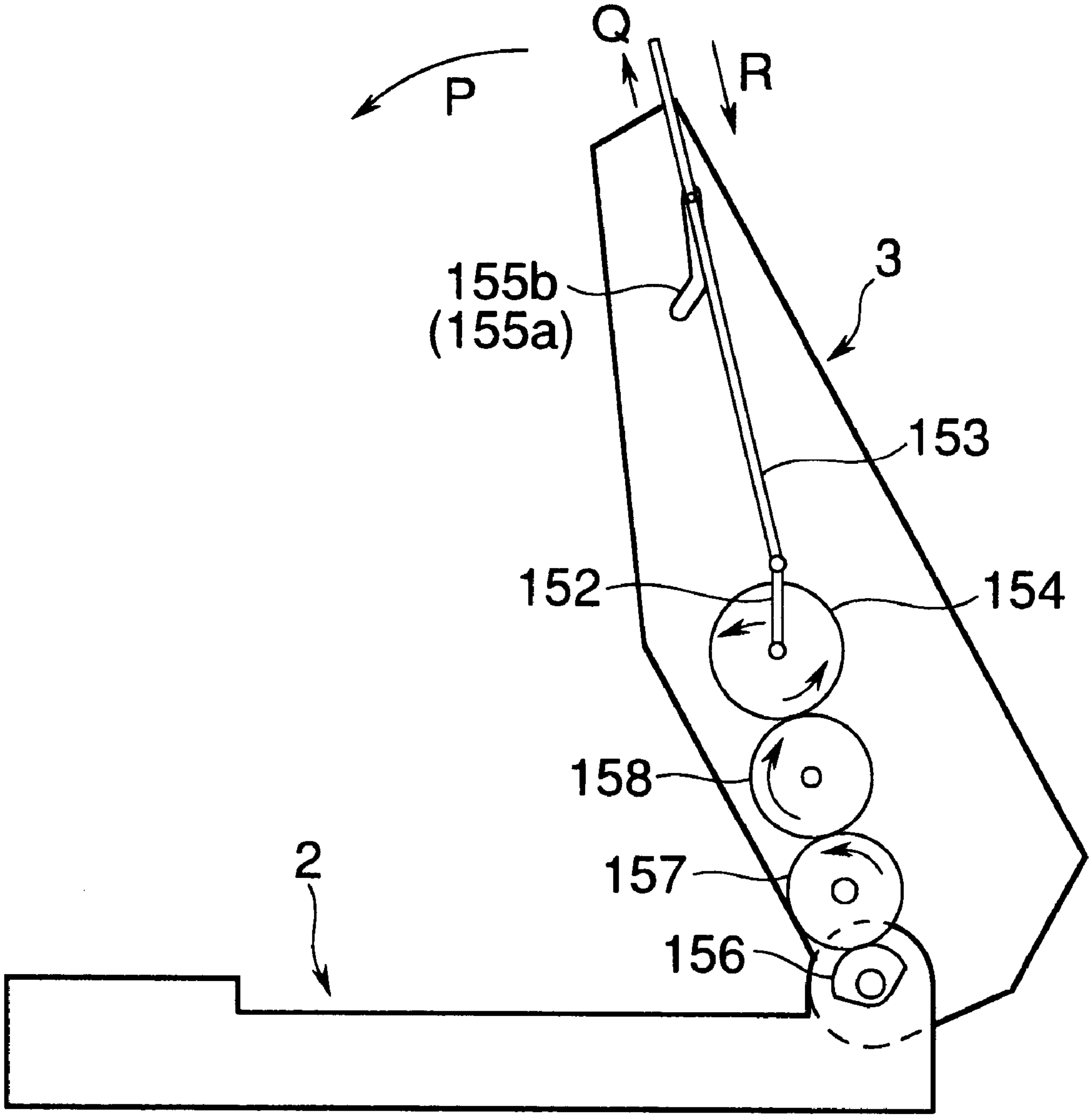
FIG. 46 is a perspective view illustrating the operation of another modified printer with respect to the fifth embodiment.
Figure 47:
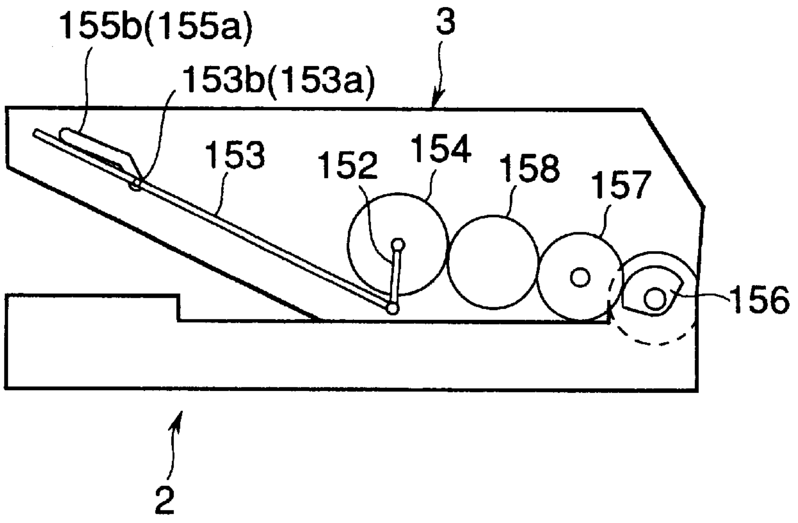
FIG. 47 is another perspective view illustrating the operation of another modified printer with respect to the fifth embodiment.

Referring to FIGS. 46 and 47, the operation of the output tray when the print unit 3 is folded will next be described. FIGS. 46 and 47 are side views illustrating the operation of another structure modified with respect to the fifth embodiment.

As the print unit 3 is turned on the shaft 5*a* from the position indicated in FIG. 45 in the direction illustrated by the arrow P, the first idle gear 157 meshes with and revolves around the fan-shaped gear 156 and also rotates counterclockwise on its axis. The rotation of the first idle gear 157 on its axis is transmitted via the second idle gear 158 to the driven gear 154 to rotate the driven gear 154 counterclockwise. The rotation of the driven gear 154 is transmitted via the supporting post 152*c* to the end plate 152 to turn the end plate 152 counterclockwise, as shown in FIG. 46. As the end plate 152 is turned, the paper table 153 is moved in the direction illustrated by the arrow Q, being guided by the guide pins 153*a* and 153*b* sliding within the guiding grooves 155*a* and 155*b*.

A further turn of the print unit 3 causes the end plate 152 and the paper table 153 to form a single flat plane. Still a further turn of the print unit 3 moves the paper table 153 in the direction illustrated by the arrow R. When the print unit 3 is folded flat, the end plate 152 and paper table 153 are disposed as shown in FIG. 47. In the position indicated in FIG. 47, the ejected paper 8 is placed on that side of the paper table 153 which is opposite to the side on which the paper is placed while the print unit 3 is raised as shown in FIG. 45.

As has been described above, the paper table 153 is reoriented and the face on which the paper is placed is changed as the print unit 3 is folded. In comparison with the fifth embodiment, this second modified structure makes the operation much easier. The print unit 3 can be raised by reversing the procedure described above.

Figure 48:
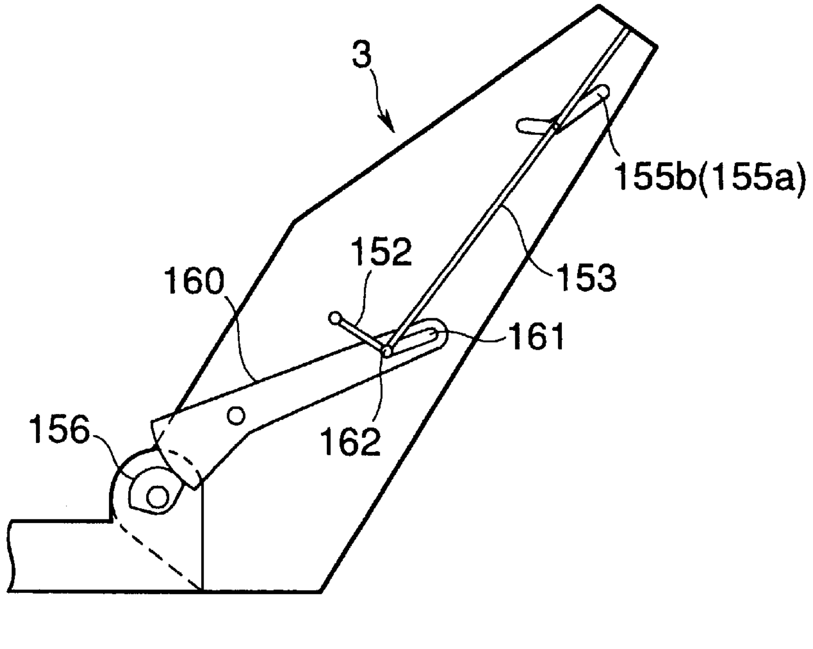
FIG. 48 is a side view showing a variation of the modified printer indicated in FIG. 45.

The second modified structure may be further modified by replacing the series of the first idle gear 157, second idle gear 158, and the driven gear 154 with a toothed arm 160 as shown in FIG. 48. FIG. 48 is a side view showing a variation of the modified structure shown in FIG. 45. In the drawing, the arm 160 engages with the fan-shaped gear 156 on one end and has a long groove 161 on the other end. A guide pin 162 joining the end plate 152 and the paper table 153 so as to be rotated is fit in the long groove so as to be slid therein. As the print unit 3 is turned counterclockwise, the arm 160 turns in the same direction. This causes the end plate 152 to be turned and the paper table 153 to be reoriented. This configuration has the same effect as the second modified structure described above.

Figure 49:
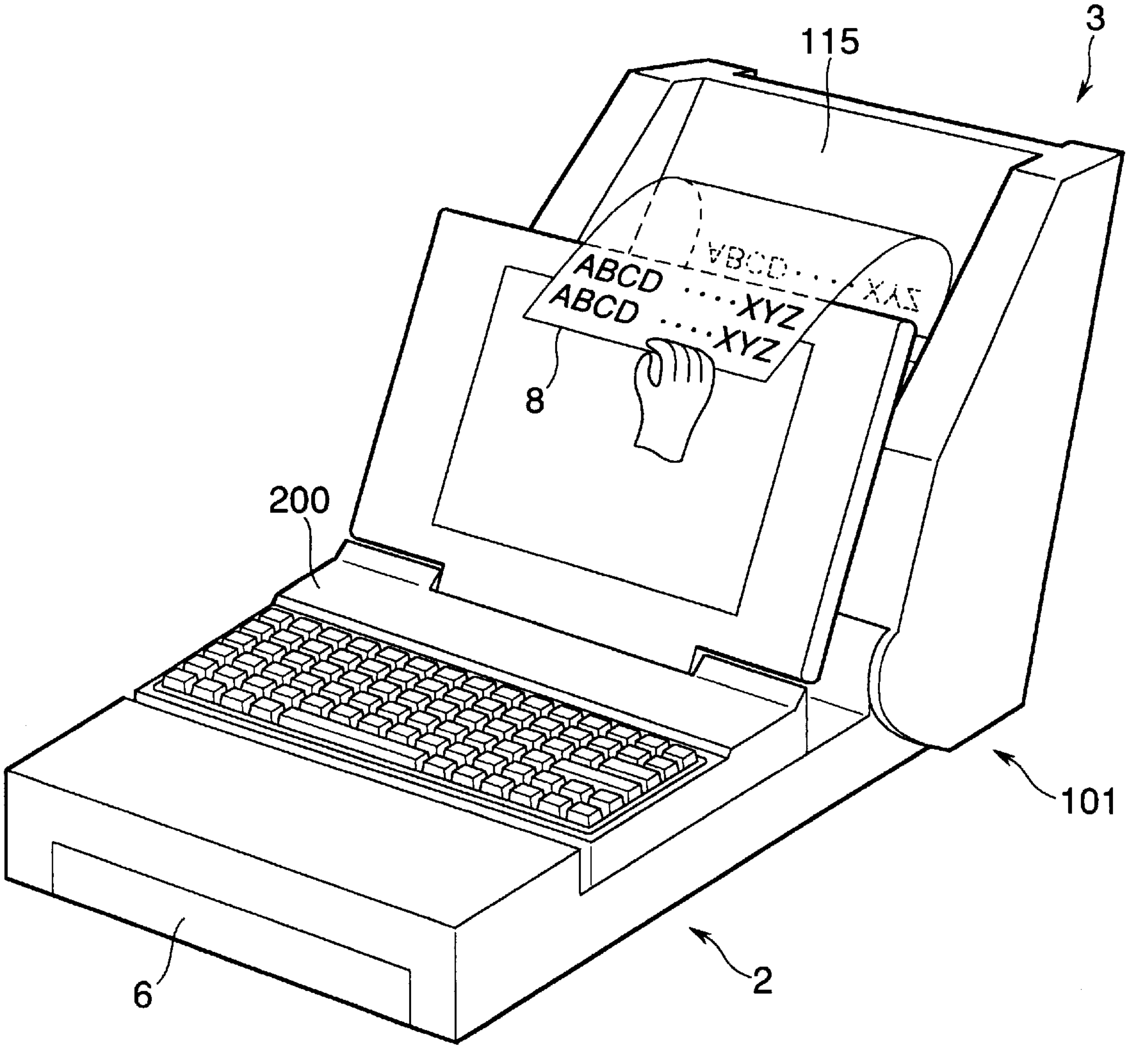
FIG. 49 is a perspective view showing a sample application of the fifth embodiment.

The present invention provides an easy-to-use printer that can print even while the notebook computer 200 is placed on the paper-feed unit 2. FIG. 49 shows an example of use by making use of the printer 101 of the fifth embodiment. In this example, the data to be printed on one sheet is turned by 180 degrees and is printed upside-down. As shown in the drawing, the paper 8 is fed out with the data printed from the bottom. The operator can always see the printed data in the proper direction when he or she draws the printed paper 8 from the output tray 115.

As has been detailed above, the printer according to the present invention can be operated while a data processing device is placed and operated on the paper-feed unit. Accordingly, while the data processing device placed or the printer itself is operating, the printer requires a small space, enabling effective use of available space. Since the print unit folds flat, the printer requires a small storage space and can keep dust out when not in use.

What is claimed is:

1. A printer for printing an image on a paper according to print data output from a data processing device, said printer comprising:

a paper-feed unit including a paper holding section for holding said paper to be printed on and a table on which said data processing device can be placed;

a print unit including a print section for printing said image according to said print data on said paper supplied from said paper-feed unit and a receiving section for receiving a printed paper; and a joint mechanism for fitting said print unit on said paper-feed unit, wherein said joint mechanism includes a shaft on which said print unit is carried so as to be turned with respect to said paper-feed unit, and said print unit has an open state in which said print unit is remote from said table of said paper-feed unit and a closed state in which said print unit folds flat on said table of said paper-feed unit.

2. A printer of claim 1, further comprising:

a shaft rotatably supported on said paper-feed unit;

a paper-feed roller fixed to said shaft, for feeding said paper held in said paper holding section;

a motor; and a power-transmission mechanism for transmitting power from said motor to said shaft, thereby turning said shaft.

3. A printer of claim 2, wherein said print unit includes a print head for printing image on said paper, and a transporting roller for transporting said paper to a front of said print head;

said power-transmission mechanism includes a first one-way gear which rotates said shaft in a first direction and does not rotate said shaft in a second direction reverse to said first direction and a second one-way gear which rotates said transporting roller in a third direction and does not rotate said transporting roller in a fourth direction reverse to said third direction;

when said motor rotates in a fifth direction, said first one-way gear rotates in said first direction thereby rotating said paper-feed roller of said paper-feed unit and supplying said paper held in said paper holding section to said print unit and said second one-way gear does not rotate; and when said motor rotates in a sixth direction reverse to said fifth direction, said first one-way gear does not rotate said shaft and said second one-way gear rotates said transporting roller in said third direction thereby transporting said paper supplied by said paper feed roller to said front of said print head.

4. A printer of claim 1, further comprising:

a paper-feed roller for supplying said paper held in said paper holding section by rotating;

a motor;

a power-transmission mechanism for transmitting power from said motor to said paper-feed roller; and when said print unit rotates from said open state to said closed state, said paper-feed roller supplies no paper held in said paper holding section to said print unit.

5. A printer of claim 4, wherein said power-transmission mechanism includes:

a relay gear which intermittently transmits said power from said motor to said paper-feed roller; and a disengaging knob mechanism for switching a state of said relay gear between a first state in which said relay gear transmits said power from said motor to said paper-feed roller and a second state in which said relay gear transmits no power to said paper-feed roller;

before said print unit is folded on said paper-feed unit, said relay gear is switched to said second state by said disengaging knob, thereby causing said power from said motor not to be transmitted to said paper-feed roller.

6. A printer of claim 4, where in an axis of said shaft of said joint mechanism is offset with respect to an axis of a rotation of said paper-feed roller;

when said print unit is in an open state in which said print unit is remote from said table of said paper-feed unit, said paper-feed roller is in contact with said paper held in said paper holding section; and when said print unit is turned on said shaft so as to be in said closed state, said paper-feed roller is also turned on said shaft and then said paper-feed roller is remote from said paper held in said paper holding section.

7. A printer of claim 4, wherein said paper-feed roller is supported by said shaft and said power-transmission mechanism includes:

a first gear which engages with said shaft and rotates said shaft so that said paper-feed roller supplies said paper;

a second gear which engages with said first gear and transmits said power from said motor to said first gear; and a third gear secured on said paper-feed unit and having a toothed section which is able to engage with said second gear, a diameter of said third gear being identical to a diameter of said first gear;

when said print unit is in an open state in which said print unit is remote from said table of said paper-feed unit and when said print unit is in a closed state in which said print unit folds flat on said table of said paper-feed unit, said second gear does not engage with said toothed section of said third gear; and during a turning operation of said print unit about said shaft, said second gear engages with said toothed section of said third gear so that said second gear does not transmit said power from said motor to said first gear.

8. A printer of claim 1, further comprising:

a support disposed on said table of said paper-feed unit and being close to a keyboard of said data processing device placed on said table on the operator's side, a top surface of said support being generally formed to be a little lower than or at the same level as a surface of said keyboard.

9. A printer of claim 8, wherein said support and said paper-feed unit are integrally formed.

10. A printer of claim 8, wherein said support includes a bed and a supporting mechanism for supporting said bed, said supporting mechanism being able to change at least one of a height and an inclination of said bed with respect to said table.

11. A printer of claim 8, wherein said support includes a bed having a shaft, said bed being able to be removed from a front of said data processing device by being turned on said shaft.

12. A printer of claim 8, further comprising:

a cover rotatably provided on said print unit so as to cover said joint mechanism; and a cover turning mechanism for turning said cover as said print unit is rotated, thereby making said cover cover said joint mechanism.

13. A printer of claim 1, further comprising a loading mechanism for providing a load with a rotation of said print unit when said print unit is folded, and for providing no load with a rotation of said print unit when said print unit is unfolded.

14. A printer for printing an image on a paper according to print data output from a data processing device, said printer comprising:

a paper-feed unit including a paper holding section for holding said paper to be printed on and a table on which said data processing device can be placed;

a print unit including a print section for printing said image according to said print data on said paper supplied from said paper-feed unit and a receiving section for receiving a printed paper; and a joint mechanism for fitting said print unit on said paper-feed unit, wherein said print unit has an open state in which said print unit is remote from said table of said paper-feed unit and a closed state in which said print unit folds flat on said table of said paper-feed unit; and said print unit is able to print said image on said paper in both said open state and said closed state.

15. A printer of claim 14, wherein said print unit includes:

a paper path formed between a couple of paper guides;

a paper table on which said paper transported along said paper path and ejected from an exit of said paper path is put; and a switching mechanism for moving said paper table so as to place at least a part of said paper table below an exit of said paper path in both said open state and said closed state.

16. A printer of claim 15, wherein said switching mechanism includes a cam mechanism which works in accordance with a turning operation of said print unit with respect to said paper-feed unit and moves said paper table so as to place at least a part of said paper table below an exit of said paper path in both said open state and said closed state.

* * * * *